United States Patent
DiMaria et al.

(10) Patent No.: US 11,803,588 B2
(45) Date of Patent: *Oct. 31, 2023

(54) AUDIOVISUAL CONTENT CURATION SYSTEM

(71) Applicant: Gracenote, Inc., Emeryville, CA (US)

(72) Inventors: Peter C. DiMaria, Emeryville, CA (US); Andrew Silverman, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,095

(22) Filed: Oct. 26, 2022

(65) Prior Publication Data

US 2023/0060539 A1 Mar. 2, 2023

Related U.S. Application Data

(63) Continuation of application No. 16/752,419, filed on Jan. 24, 2020, now Pat. No. 11,487,813, which is a continuation of application No. 15/343,884, filed on Nov. 4, 2016, now Pat. No. 10,546,016.

(60) Provisional application No. 62/251,952, filed on Nov. 6, 2015.

(51) Int. Cl.
*G06F 16/00* (2019.01)
*G06F 16/61* (2019.01)
*G06F 16/68* (2019.01)

(52) U.S. Cl.
CPC ............ *G06F 16/61* (2019.01); *G06F 16/686* (2019.01)

(58) Field of Classification Search
None
See application file for complete search history.

(56) References Cited

U.S. PATENT DOCUMENTS

| | | | |
|---|---|---|---|
| 6,993,532 B1 | 1/2006 | Platt et al. | |
| 7,081,579 B2 | 7/2006 | Alcalde et al. | |
| 7,987,182 B2 | 7/2011 | Slothouber et al. | |
| 8,316,015 B2 | 11/2012 | Svendsen et al. | |
| 8,364,669 B1 | 1/2013 | Chowdhury et al. | |
| 8,874,574 B2 | 10/2014 | Purdy | |
| 8,887,058 B2 | 11/2014 | Gewecke et al. | |
| 9,020,923 B2 | 4/2015 | Hierons et al. | |
| 9,219,634 B1 | 12/2015 | Morse et al. | |
| 9,335,818 B2 * | 5/2016 | Ye | G06F 3/01 |

(Continued)

OTHER PUBLICATIONS

Cooper et al., "Summarizing popular music via structural similarity analysis," Applications of Signal Processing to Audio and Acoustics, 2003, IEEE Workshop on Applications of Signal Processing to Audio and Acoustics, Oct. 19, 2003, 4 pages.

(Continued)

*Primary Examiner* — Debbie M Le
(74) *Attorney, Agent, or Firm* — McDonnell Boehnen Hulbert & Berghoff LLP

(57) ABSTRACT

Systems and methods are provided for filtering at least one media content catalog based on criteria for a station library to generate a first list of candidate tracks for the station library, combining a similarity score and a popularity score for each track of the first list of candidate tracks to generate a total score for each track of the first list of candidate tracks, generating a list of top ranked tracks for the first genre, and returning the list of top ranked tracks of the first genre as part of the station library.

20 Claims, 13 Drawing Sheets

(56) References Cited

U.S. PATENT DOCUMENTS

| | | | |
|---|---|---|---|
| 9,355,174 | B2 | 5/2016 | Moss et al. |
| 9,407,947 | B1 * | 8/2016 | Donoghue ....... H04N 21/26291 |
| 9,496,003 | B2 | 11/2016 | Gates et al. |
| 10,108,619 | B2 | 10/2018 | DiMaria et al. |
| 10,504,156 | B2 * | 12/2019 | Mok ........................ G06F 16/44 |
| 10,708,661 | B2 * | 7/2020 | Bagga .................... H04N 21/47 |
| 2007/0089057 | A1 | 4/2007 | Kindig |
| 2012/0096011 | A1 | 4/2012 | Kay et al. |
| 2012/0102410 | A1 | 4/2012 | Gewecke et al. |
| 2013/0218942 | A1 * | 8/2013 | Willis .................... G06Q 50/01 |
| | | | 709/201 |
| 2013/0339434 | A1 | 12/2013 | Nogues et al. |
| 2014/0114772 | A1 * | 4/2014 | Mok ........................ G06F 16/44 |
| | | | 705/14.67 |
| 2015/0207824 | A1 | 7/2015 | Sathish et al. |
| 2016/0142774 | A1 | 5/2016 | Sayyadi-Harikandehei |
| 2016/0154887 | A1 | 6/2016 | Zhao |
| 2016/0196270 | A1 | 7/2016 | DiMaria et al. |
| 2016/0299906 | A1 | 10/2016 | Cartoon et al. |
| 2017/0054779 | A1 | 2/2017 | Ehmann et al. |

OTHER PUBLICATIONS

Non-Final Office Action issued in connection with U.S. Appl. No. 15/343,884 dated Oct. 4, 2018, 10 pages.

Final Office Action issued in connection with U.S. Appl. No. 15/343,884 dated Apr. 25, 2019, 10 pages.

Notice of Allowance and Fee(s) Due issued in connection with U.S. Appl. No. 15/343,884 dated Sep. 11, 2019, 9 pages.

* cited by examiner

FIG. 4

| | ALL MOODS | | | |
|---|---|---|---|---|
| | | PEACEFUL (+3) (+1) | | |
| | | ☐ | PEACEFUL/HEALING/REVERENT | ⎫ |
| | | ☒ | QUIET/INTROSPECTIVE | ⎬ 414 |
| | | ☐ | LIGHT/DELICATE/GENTLE/TRANQUIL | |
| | | ☐ | PASTORAL/LYRICAL/SERENE | ⎭ |
| | | ROMANTIC (+4) | | |
| | | ☒ | SOPHISTICATED/LUSH/ROMANTIC | ⎫ |
| | | ☒ | SWEET BALLAD | ⎬ 416 |
| | | ☒ | HEARTFELT ROMANTIC STRENGTH | |
| | | ☒ | LYRICAL ROMANTIC DRAMATIC EMOTION | ⎭ |
| | | SENTIMENTAL (+1) | | |
| | | ☒ | SENTIMENTAL | ⎫ |
| | | ☐ | GENTLE BITTERSWEET | ⎬ 418 |
| | | ☐ | TOUCHING/TENDER/SINSCERE | |
| | | ☐ | DARK/COOL/MELANCHOLY | ⎭ |
| | | ☐ | TENDER | |
| | | ☐ | EASYGOING | |

500 ─┐

| STATION DEFINITION |
|---|
| GENRE (2) ▽ |
| MOOD (5) △ |
| ▽ X PEACEFUL |
| X PEACEFUL/HEALING/REVERENT |
| X QUIET/INTROSPECTIVE |
| ▽ X SENTIMENTAL |
| X SENTIMENTAL |
| ▽ X SOMBER |
| X ENIGMATIC/BROODING/MYSTERIOUS |
| ▽ X MELANCHOLY |
| X ENCHANTED/MYSTERIOUS/DREAMY |
| ERA (19) △ |
| ▽ X 2000'S |
| ▷ X EARLY 2000'S |
| ▷ X 1990'S |
| ORIGIN (42) △ |
| ▽ X WESTERN EUROPE |
| ▷ X FRANCE |
| ▷ X GERMANY |
| ▷ X UNITED KINGDOM |
| ARTIST TYPE (0) △ |

*FIG. 5*

| RANK | SONG TITLE | ARTIST | ALBUM | GENRE |
|---|---|---|---|---|
| | FULL CATALOG | | | |
| 1 | LICHEN | APHEX TWIN | SELECTED AMBIENT WORKS, VOL. 2 (DISC 2) | AMBIENT |
| 2 | Z TWIG | APHEX TWIN | SELECTED AMBIENT WORKS, VOL. 2 (DISC 2) | AMBIENT |
| 3 | RHUBARB | APHEX TWIN | SELECTED AMBIENT WORKS, VOL. 2 (DISC 1) | AMBIENT |
| 4 | PARALLEL STRIPES | APHEX TWIN | SELECTED AMBIENT WORKS, VOL. 2 (DISC 2) | AMBIENT |
| 5 | BLUE CALX | APHEX TWIN | SELECTED AMBIENT WORKS, VOL. 2 (DISC 1) | AMBIENT |
| 6 | MOULD | APHEX TWIN | SELECTED AMBIENT WORKS, VOL. 2 (DISC 2) | AMBIENT |
| 7 | RADIATOR | APHEX TWIN | SELECTED AMBIENT WORKS, VOL. 2 (DISC 1) | AMBIENT |
| 8 | WHITE BLUR 2 | APHEX TWIN | SELECTED AMBIENT WORKS, VOL. 2 (DISC 2) | AMBIENT |
| 9 | CURTAINS | APHEX TWIN | SELECTED AMBIENT WORKS, VOL. 2 (DISC 1) | AMBIENT |
| 10 | OUT OF THIS WORLD (VERSION 13) | THE ART OF NOISE | THE SEDUCTION OF CLAUDE DEBUSSY | AMBIENT |
| 11 | SWIMMING | ROGER ENO | SWIMMING | AMBIENT (+6) |
| 12 | TRIENNALE | BRIAN ENO | THE SHUTOV ASSEMBLY | AMBIENT |
| 13 | IN WATER | ROGER ENO | SWIMMING | AMBIENT (+6) |
| 14 | QUIET AWAKENING PT. 1 | PHILIPPE BESTION | ZEN & RELAXATION MUSIC | AMBIENT |
| 15 | CAVE OF ANGELS | DREADZONE | SECOND LIGHT | DUB ELECTRONICA (+1) |
| 16 | SPACE DIARY 1 | BRIAN ENO & JAH WOBBLE | SPINNER | AMBIENT |
| 17 | SHINING PATH | DREADZONE | SECOND LIGHT | DUB ELECTRONICA (+1) |
| 18 | CEREBRAL | THE FUTURE SOUND OF LONDON | LIFEFORMS (DISC 2) | AMBIENT (+2) |
| 19 | NIGHT TRAFFIC | BRIAN ENO & J. PETER SCHWALM | DRAWN FROM LIFE | AMBIENT (+1) |
| 20 | CAVALLINO | BRIAN ENO | THE SHUTOV ASSEMBLY | AMBIENT |

FIG. 6A

| ALTERNATIVE 1 | | | | | | |
|---|---|---|---|---|---|---|
| MOOD | ERA | ORIGIN | ARTIST TYPE | POP | SIM | SCORE |
| PEACEFUL/HEALING/REVERENT (+1) | 1994 | ENGLAND | MALE SOLO-SOLO INSTRUMENTAL | 387 | 904 | 516 |
| PEACEFUL/HEALING/REVERENT (+3) | 1994 | ENGLAND | MALE SOLO-SOLO INSTRUMENTAL | 390 | 894 | 515 |
| PEACEFUL/HEALING/REVERENT (+2) | 1994 | ENGLAND | MALE SOLO-SOLO INSTRUMENTAL | 376 | 894 | 505 |
| PEACEFUL/HEALING/REVERENT (+4) | 1994 | ENGLAND | MALE SOLO-SOLO INSTRUMENTAL | 390 | 848 | 504 |
| ENIGMATIC/BROODING/MYSTERIOUS (+5) | 1994 | ENGLAND | MALE SOLO-SOLO INSTRUMENTAL | 396 | 815 | 500 |
| QUIET/INTROSPECTIVE (+1) | 1994 | ENGLAND | MALE SOLO-SOLO INSTRUMENTAL | 376 | 854 | 495 |
| PEACEFUL/HEALING/REVERENT (+9) | 1994 | ENGLAND | MALE SOLO-SOLO INSTRUMENTAL | 376 | 843 | 492 |
| ENIGMATIC/BROODING/MYSTERIOUS (+12) | 1994 | ENGLAND | MALE SOLO-SOLO INSTRUMENTAL | 390 | 731 | 474 |
| PEACEFUL/HEALING/REVERENT (+8) | 1994 | ENGLAND | MALE SOLO-SOLO INSTRUMENTAL | 376 | 749 | 469 |
| ENIGMATIC/BROODING/MYSTERIOUS (+10) | 1999 | LONDON | MIXED GROUP-MIXED DUO/GROUP | 320 | 854 | 453 |
| ENCHANTED/MYSTERIOUS/DREAMY (+10) | 1996 | ENGLAND | MALE SOLO-SOLO INSTRUMENTAL | 375 | 643 | 441 |
| PEACEFUL/HEALING/REVERENT (+10) | 1992 | ENGLAND | MALE SOLO-SOLO INSTRUMENTAL | 299 | 832 | 432 |
| ENCHANTED/MYSTERIOUS/DREAMY (+10) | 1996 | ENGLAND | MALE SOLO-SOLO INSTRUMENTAL | 375 | 593 | 429 |
| PEACEFUL/HEALING/REVERENT (+13) | 2003 | FRANCE | MALE SOLO-SOLO INSTRUMENTAL | 289 | 765 | 407 |
| ENIGMATIC/BROODING/MYSTERIOUS (+23) | 1995 | LONDON | MALE GROUP-DUO/GROUP VOCAL | 345 | 560 | 398 |
| QUIET/INTROSPECTIVE (+14) | 1995 | ENGLAND | MALE DUO-DUO INSTRUMENTAL | 254 | 798 | 389 |
| QUIET/INTROSPECTIVE (+12) | 1995 | LONDON | MALE GROUP-DUO/GROUP VOCAL | 278 | 676 | 377 |
| SENTIMENTAL (+25) | 1991 | MANCHESTER | MALE DUO-DUO INSTRUMENTAL | 332 | 509 | 376 |
| ENIGMATIC/BROODING/MYSTERIOUS (+11) | 2001 | ENGLAND | MALE DUO-DUO INSTRUMENTAL | 264 | 699 | 372 |
| PEACEFUL/HEALING/REVERENT (+11) | 1992 | ENGLAND | MALE SOLO-SOLO INSTRUMENTAL | 221 | 816 | 369 |

FIG. 6B

AUDIOVISUAL CONTENT CURATION SYSTEM

RELATED APPLICATIONS

This patent arises from a continuation of U.S. patent application Ser. No. 16/752,419, filed on Jan. 24, 2020, now U.S. Pat. No. 11,487,813, which is a continuation of U.S. patent application Ser. No. 15/343,884, filed on Nov. 4, 2016, now U.S. Pat. No. 10,546,016, which claims the benefit of U.S. Provisional Application Ser. No. 62/251,952, which was filed on Nov. 6, 2015. U.S. patent application Ser. No. 15/343,884 and U.S. Patent Application Ser. No. 62/251,952 are hereby incorporated herein by reference in their respective entireties.

BACKGROUND

The amount of audio recordings, video recording, and other media content is staggering. For example, one catalog of audio recordings may contain over thirty million audio tracks. Moreover, media catalogs change over time. For example, new audio and video is constantly being recorded and various users and entities may have access to different content in one or more catalogs based on licenses or other agreements with record labels, music publishers, content authors, and so forth.

BRIEF DESCRIPTION OF THE DRAWINGS

Various ones of the appended drawings merely illustrate example embodiments of the present disclosure and should not be considered as limiting its scope.

FIGS. 2-9 illustrate example interfaces, according to some example embodiments.

DETAILED DESCRIPTION

Systems and methods described herein relate to media (e.g., audio, video, etc.) curation and enable efficient, accurate, and scalable creation of highly-focused, criteria-based dynamic station libraries (e.g., music channels by a music programmer), drawing from massive catalogs (e.g., thirty million tracks). Example embodiments provide a user interface and supporting functionality for creating one or more station libraries from one or more media content catalogs. A user may provide criteria for a station library and a server system may generate the station library based on the criteria.

For example, the server system may receive a request for a station library. The request may comprise criteria for a station library. For example, the criteria may include at least a first genre. The server system may filter at least one media content catalog based on the criteria for the station library to generate a first list of candidate tracks for the station library. The server system may determine the total number of tracks to be selected for the first genre, based on the criteria. The server system may generate a similarity score for each track of the first list of candidate tracks, determine a popularity score for each track of the first list of candidate tracks, and combine the similarity score and popularity score for each track of the first list of candidate tracks to generate a total score for each track of the first list of candidate tracks. The server system may select the top ranked tracks of the first list of candidate tracks based on the total number of tracks to be selected for the first genre to generate a list of top ranked tracks for the first genre. The server system may return the list of top ranked tracks of the first genre as part of the station library list.

Figure 1:
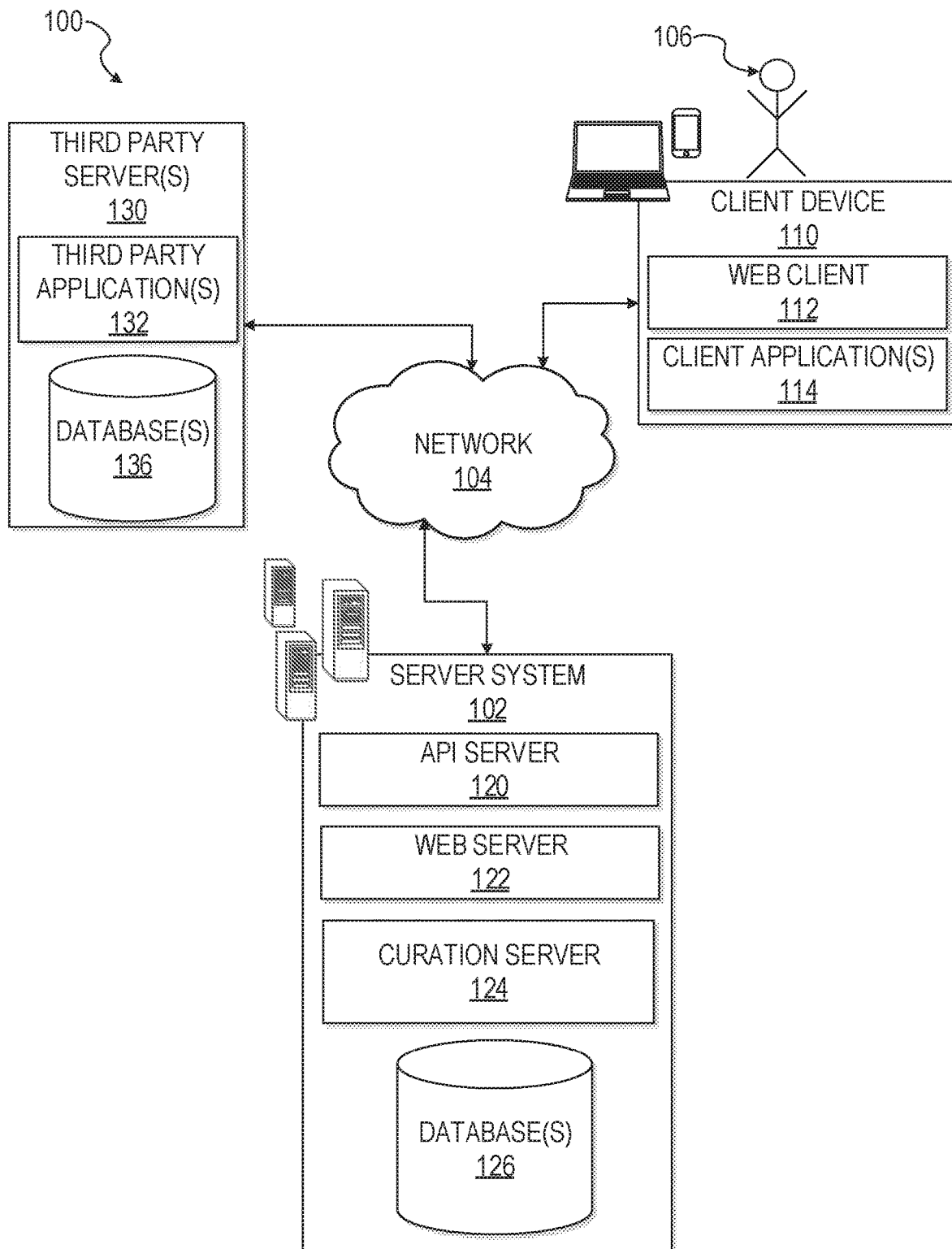
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user 106 that is used to search and display various information, such as information on the Internet via an application such as a web browser, etc. In one embodiment, the system 100 is a media curation system that allows a user 106 to create and edit station libraries for content stations.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, a news or media application, a media curation tool application, and the like. In some embodiments, one or more client applications 114 may be included in a given one of the client device 110, and configured to locally provide the user interface and at least some of the functionalities with the client application 114 configured to communicate with other entities in the system 100 (e.g., web servers 130, server system 102, etc.), on an as needed basis, for data and/or processing capabilities not locally available (e.g., access to various information, to authenticate a user 106, to verify a method of payment, to retrieve/synchronize footprints, etc.). Conversely, one or more client applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and a curation server 124, that may be communicatively coupled with one or more database(s) 126. The database(s) 126 may be storage devices that store information such as information associated with users of the system 100, information related to audio content, audio curation, media content, media curation, etc.

The system 100 may further include one or more third party server(s) 130. The one or more third party servers 130 may include one or more third party application(s) 132. The one or more third party application(s) 132, executing on third party server(s) 130, may interact with the server system 102, for example, via API server 120 via a programmatic interface provided by the API server 120. For example, one or more of the third party applications 132 may request and utilize information from the server system 102 via the API server 120 to support one or more features or functions on an application hosted by the third party server 130. The third party application 132, for example, may provide various functionality related to media curation that are supported by relevant functionality and data in the server system 102. The third party server(s) 130 may be communicatively coupled with one or more databases 136. The databases 136 may be storage devices that store information such as information associated with audio content, audio curation, media content, media curation, users, applications, websites, etc. For example, the databases 136 may store information for one or more media catalogs associated with the third party.

Example embodiments allow users (e.g., music programmers, curators, editors, end users, etc.) to create highly specific and customized criteria-based music station definitions, dynamically generate station libraries based on the definitions, and view example playlists containing tracks selected from the station library.

A station definition may be used to define criteria for a station library. A station definition may be comprised of two elements. A first element may be a set of genre, mood, origin, era, artist type, etc. values that can be associated with tracks in a resulting station library. A second element may be a mix percent, which controls how many tracks of each first element are present in a station library. For example, the second element may be a set of genre mix percent, mood percent, origin percent, era percent, artist type percent, and so forth. Or the second element may only be one of these or a few of these. The ability to set a mix percent for any element or criteria may be determined by a user. For example, a user may not want to set any mix percentages, may want to only select a genre mix percent, may want to set a genre mix percent and a mood mix percent, and so forth.

Station definitions may be named, saved, retrieved and edited. All may be managed under a secure user account administrative control.

FIGS. 2-9 illustrate example components of a graphical user interface of a curation tool application that allows a user to create one or more station definitions to generate one or more station libraries. The user may interact with the user interface of the curation tool application (e.g., client application 114 or third party application 132) on a client device 110, using an input device (e.g., mouse, touchpad, trackpad, etc.) or via a touchscreen or other method/mechanism. The client application 114 and/or third party application 132, may communicate with the server system 102 for various functionality (e.g., related to generating a station library, playlist, etc.).

In one example, the user interface of the curation tool may be generated by a third party server 130 to be displayed on a client device 110. In another example, the user interface may be generated by the client device 110. In yet another example, the user interface may be generated by the server system 102 to be displayed on the client device 110. In other examples, a combination of devices may be used to generate the user interface for display on the client device 110. The user interface may be organized into different sections or components.

Figure 2:
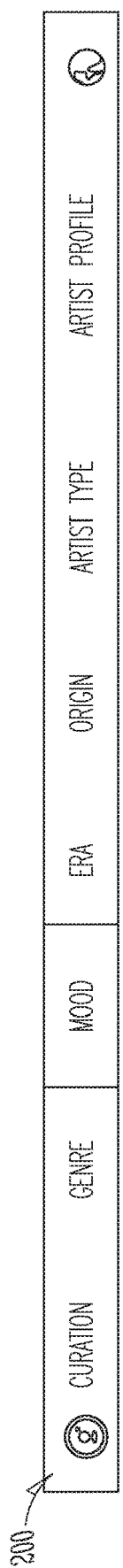

A first section may be a menu bar 200 that may be a category or criteria selector as shown in FIG. 2. The selector allows a user to choose which descriptor type (e.g., genre, mood, etc.) the user would like to edit as part of a station definition, or view all descriptors assigned to a specific artist when "Artist Profile" is selected. For example, the menu bar 200 may be a bar spanning the top of a display of a user interface. The menu bar 200 may be organized into sections, such as genre, mood, era, origin, artist type, and artist profile. The menu bar 200 in FIG. 2 is an example showing specific categories or criteria, though it is understood that the menu bar may display a subset of this criteria, additional criteria, or different criteria.

Figure 3:
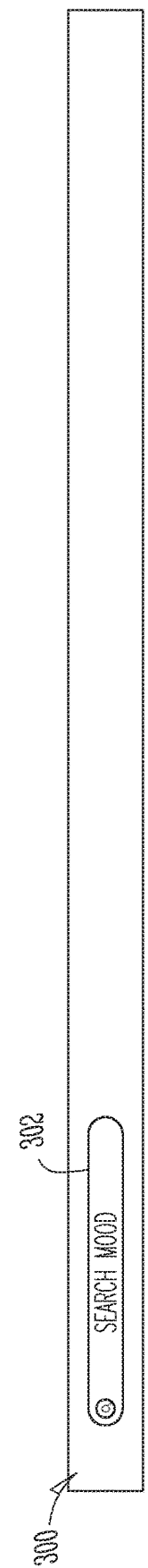
Figure 7:
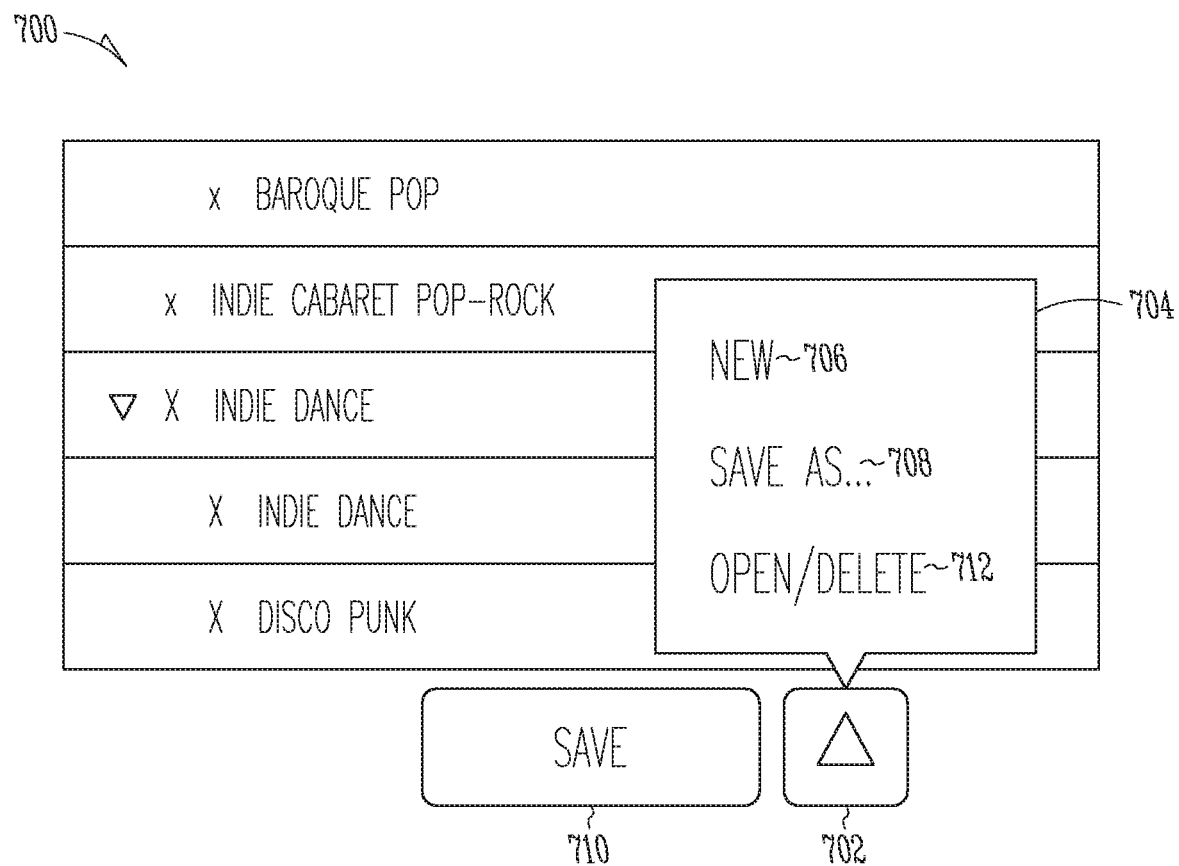

A second section of the user interface may be a search bar 300 as shown in FIG. 3. The search bar 300 may be located directly below the selector that is shown in FIG. 2. The search bar 300 may contain a text entry screen 302 where a user may search on the name of a descriptor of the currently selected category type, or on the name of an artist if "Artist Profile" is selected in the selector.

A third section of the user interface may be a definition workspace 400 as shown in FIG. 4. The definition workspace 400 may be located directly below the search bar 300 shown in FIG. 3 and may be a primary area for creating a station definition. In definition workspace 400, a user may select (and de-select) individual descriptor categories (e.g., genre, mood, era, origin, artist type, etc.) for inclusion in the user's station definition, and do so at the hierarchical level that is most appropriate and efficient for the user's needs. The user may also select descriptor categories already associated with a known artist for inclusion in the user's station definition, when "Artist Profile" is selected.

The example definition workspace 400 shows a category for All moods 402 which contains several subcategories such as Peaceful 404, Romantic 406, Sentimental 408, Tender 410, and Easygoing 412, as examples. Under each of these subcategories is a number of further subcategories 414, 416, and 418.

A fourth section of the user interface may be a station definition summary 500 as shown in FIG. 5. The station definition summary 500 may be located on the right side of the screen. The station definition summary 500 may display all elements of the current station definition from the categories (and subcategories) selected in the definition workspace 400 shown in FIG. 4. Individual categories may also be removed by a user from the station definition in the station definition summary 500, and the relative mix of different selected categories may also be adjusted here in order to fine tune the station definition.

A fifth section of the user interface may be a station library and playlist results display 600 as shown in FIGS. 6A and 6B. Note that the display 600 shown is FIG. 6A and FIG. 6B may be one screen display, but has been split into two figures to for better visibility. The station library and playlist results display 600 may be located directly below the definition workspace 400, in the lower left of a display. This section may display the track-level content of either an entire station library that has been generated from the current station definition, or an example sequenced playlist of tracks selected from the station library. The view displayed may be dependent on the options selected in a display options dialog (not shown).

As shown in FIGS. 6A and 6B, each track may contain information such as rank 602, title 604, artist 606, album 608, genre 610, mood 612, era 614, origin 616, artist type 618, popularity score 620, similarity score 622, total score 623, among other information (e.g., catalog identifier(s), external identifier(s), etc.).

Categories may comprise descriptor values which may be organized into hierarchies or "trees" and viewed in the station definition workspace 400, as shown in the example in FIG. 4. In one example, hierarchy levels may use the convention of "L[level number], with a level number of "1" referring to the top level of each hierarchy, then next (child) level down being level number "2", and so on. Thus, for example, in the genre hierarchy, there may be levels "L1", "L2", "L3" and "L4", whereas there may be fewer levels in some of the other descriptor types.

When a category is first selected from the category selector (e.g., shown in FIG. 2), only the top, or "L1", level of the respective hierarchy may be displayed. A user may select any one or more L1 values from these lists. For example, if "Genre" is selected from the category selector, the user might, for example, choose to select three L1 values such as Electronica, Indie and Alternative to add to the user's station definition.

To view the next level of descriptor values under any parent hierarchy node, a user may select a right-facing black arrow immediately to the left of the descriptor value's check box. This may cause the arrow to change to a downward facing orientation, indicating that the child elements are now being displayed. All descriptor values in the next child level may now be displayed. Descriptor values in the child level that themselves contain a further child level may be indicated by the presence of a right-ward facing arrow and bold name text. This may be done until the full hierarchy tree is exposed for any root L1 descriptor value.

To close or collapse any branch of a hierarchy, a user may select a downward-facing arrow to the left of the parent node of the branch that he wishes to hide. This may cause the arrow to revert back to a rightward-facing orientation, and all child nodes may be hidden. Note that if the same parent node is opened again in the same station definition session, the previous state of the open vs. collapsed view of all child branches may be retained.

For any descriptor that has subcategories, a red oval with a number inside preceded by a "+" sign may be displayed to the right of the descriptor name when the parent descriptor is selected. This number indicates the number of subcategories ("children") that are contained in the next child level of the hierarchy, and are thus also automatically selected. There may be additional child values at one or more levels below the selected value.

The media curation tool may provide various modes to make it easier for a user to find a specific descriptor value that may be useful for his station definition. This capability may be especially useful since there are a very large number of descriptor values where it cannot be expected that the user will necessarily be able to recall all of the potentially relevant ones for the development of their station definition.

A first example mode may be to search for text contained in descriptor value names directly. To do this, from any category view, a user may enter the desired text string into a search box in a station definition workspace header (e.g., as shown in FIG. 3). For example, when the genre category is selected, the search may be applied to all genre descriptor value names, and the same focus may be true for mood, origin, era, artist, and any other category. The results of the search may be displayed via a pruned version of the complete descriptor hierarchy tree, which now only displays those nodes that contain the search term.

In one example, if a user is looking for mood that has a "dreamy" quality, they would select the "mood" category view and enter "dreamy" into the search box. The results would then show that there are actually five different mood descriptor values all containing the string "dreamy", for example, "Lite Groovy/Dreamy/Precious", "Energetic Dreamy/Bittersweet", "Deep Dreamy Relaxing Beat", "Enchanted/Mysterious/Dreamy", and "Dark/Dreamy/Brooding". The user may then select one or more of these to include in the definition as they see fit. In one example embodiment, this may be a sub-string search and only terms in leaf nodes may be searched.

A second example mode for searching for relevant descriptor values may be to do so via the descriptor profiles of artists known to the user, who possess attributes that he or she feels is relevant to the station definition that they are creating. This capability may be especially useful in the scenario where the user may not be familiar with all of the specific genre descriptor terms in the media curation tool taxonomy but can easily think of representative artists who play music in the style that they are looking to include in the station definition.

For example, if the user knows that they would like their station definition to retrieve music that has some affinity with the artist Stereolab, they may select the "Artist Profile" tab at the top right of the station definition workspace, and enter "Stereolab" in the search box. The user may then see a simplified display of the artist's descriptor profile. For example, each descriptor value for genre, origin, era, and artist type that are associated with the artist may be shown. Along with each descriptor may be a checkbox. The user may then select one or more of the checkboxes to include the associated descriptors (e.g., the genre of "Baroque Pop") into the current station definition.

When the media curation tool is launched, there may be no default definition already in place. In a sense, no description values may be allowed in the default state—all tracks may be filtered out because all descriptor values are effectively being filtered. The user may intervene to add allowed descriptor values to a definition, and thus see any tracks listed in the station library view. Descriptors may be selected at any level in any hierarchy.

A user may select any one of the various categories or "Artist Profile" from the category selector. To add any of the descriptor values displayed, the user may select a checkbox immediately to the left of the descriptor value name. A red check may appear in the check box and the descriptor name text color may change to red, indicating that that descriptor value is now added to the station definition; therefore tracks annotated with this descriptor value as the primary value of that type may be allowed in the station library. The primary value may be the descriptor value of a given type (e.g., genre) that has the greatest weight associated with it for the selected track (e.g., 75%) in cases where there is more than one value of the same type assigned to a single track.

There may be no limit to the number of descriptor values that can be selected for a single station definition, and the values may be selected from any combination of hierarchy levels from any combination of descriptor types.

Selecting a name or checkbox of any previously selected descriptor value may have the effect of removing it from the station definition, which may be indicated by the check not appearing in the check box and the text reverting to black from red. De-selecting a previously selected descriptor category may also de-select any and all child descriptor values. When any one or more child descriptor values, at any level in the hierarchy, are de-selected, the color of any parent descriptor values may revert to black, though the count of selected child descriptor values may still appear in the red oval of any descriptor value which may have one or more child values selected in the immediately adjacent child level.

To completely remove all values from the entire tree under a particular L1 root of a particular descriptor type, a user may de-select the root (e.g., "Peaceful" Mood or "Blues" Genre). To add back all values under the same L1 parent, the user may select the parent L1 node again.

For each tab in the category selector view, there may be a single "All" node representing all values of the descriptor type above the L1 descriptor values. Selecting the "All" node may select all values of the selected descriptor type, and all checkboxes may be selected for every node. Stated another way, there may be no filters on any content based on the primary descriptor value of the selected type.

De-selecting or "un-checking" the "All" node may de-select all values of the descriptor type. If one or more values in any other descriptor type are selected for the definition, this may have the effect of allowing all values of the selected descriptor type.

If a user wishes to include most values of a particular descriptor type in a station definition, and only filter out a small set, a user may start out by selecting the highest parent node applicable (including the "All") root, and then prune away the child nodes that are not desired. If, on the other hand, a user wishes to only include a relatively small number of descriptor values of a particular descriptor type in a station definition, then the user may start out by ensuring the entire tree is de-selected, and only select the desired nodes by exception.

If the station definition specifies an unusual combination of descriptor values, the results displayed in the station library may be limited in number or null.

By default, station definitions may select a mix of content (e.g., a percent mix or mix percent) that is equally distributed across selected descriptor categories. To adjust this default mix (for example, to put a greater emphasis on Two-Tone "Ska Revival" versus "Synth Pop"), a user may first select a bars icon in the upper right of the station definition summary section in order to put the station definition summary into "genre mix" mode. Once in genre mix mode, the user may use slider bars to adjust the relative mix of each genre contained in the station definition. In an example case, the user can slide the "Ska Revival" mix slider bar to the right to increase the relative proportion of "Ska Revival" Tracks versus "Synth Pop" Tracks in the station library. Genre mix sliders for parent nodes may also adjust their child nodes in a proportional manner. The content of the station library may be re-computed after each adjustment of the genre mix. The genre mix is recorded as part of the station definition.

To set a primary descriptor type, a user may select a gear wheel icon 624 at the right of the station library and playlist results display header 630 to open up the station settings view dialog. In the station setting view dialog a user may change the primary descriptor type by using the drop-down menu to the right of "Primary Descriptor Type". There may be various options (e.g., genre, mood, origin, era, artist type, none, etc.). Genre may be the default primary descriptor type.

Each time a change is made in the station definition (e.g., the user makes an update), the content of the station library may be recomputed. A user may review the content of the station library.

The station library and playlist results display 600 may provide various fields of information to the user in order to fully identify and understand the nature of each recording in the library. Some examples of fields includes rank, title (e.g., track or song title), artist, album, genre, mood, era, origin, artist type, popularity (POP), similarity (SIM), score (e.g., total score), and XID (e.g., external identifier). The fields described below are example fields, and embodiments described herein are not limited to only these fields. Some embodiments may include some, all, and/or other fields.

A rank field may be an integer-ordered rank of the track, starting at 1, based on the score of its underlying the recording. The track with the highest score may receive a rank of 1 and the track with the lowest score may have the highest rank value, equal to the number of recordings in the particular station library.

A title field may be the title of the composition performed in the recording contained in the selected release track. An artist field may be the recording artist who created the recording contained in the selected track. The album field may be the title of the album contained in the selected track.

The genre field may be the primary master genre code label associated with the recording contained in the selected track. A recording may be associated with more than one genre. The primary genre may be the one that has the greatest weight associated with it for the selected recording, in cases where more than one genre is assigned.

A mood field may be the primary master mood code label associated with the recording contained in the selected track. A recording may be associated with more than one mood. The primary mood may be the one that has the greatest weight associated with it for the selected recording, in cases where more than one mood is assigned.

An era field may be the primary master era code label associated with the recording contained in the selected track. A recording may be associated with more than one era. The primary era may be the one that has the greatest weight associated with it for the selected recording, in cases where more than one era is assigned. When a valid release year is available for the recording, the release year may be displayed; if no release year is available, the era(s) associated with the artist may be displayed.

An origin field may be a primary master origin code label associated with the recording contained in the selected track. A recording may be associated with more than one origin. The primary origin may be the one that has the greatest weight associated with it for the selected recording, in cases where more than one origin is assigned.

An artist type field may be a primary master artist type code label associated with the recording contained in the selected track. A recording may be associated with more than one artist type. The primary origin may be the one that has the greatest weight associated with it for the selected recording, in cases where more than one artist type is assigned.

A popularity (POP) field may be a popularity score associated with the recordings contained in the selected track. Popularity may be based on the combination of several different indicators of popularity. For example, popularity may be based on how many times an album with the track is searched for by users, how many times users recognize a song using fingerprint technology, music charts data for popular songs, and so forth.

A similarity (SIM) field may be a similarity score based on how strongly the recording's descriptor vectors align with the specific station definition. For example, for a station definition comprised of a single mood of "Gentle Bittersweet", a recording which has a primary mood of Genre Bittersweet with a weight of 82 may have a higher similarity score than another one with a primary mood of Genre Bittersweet, but with a weight of only 64. Likewise, the former recording may also have a higher similarity score versus another recording that also has a primary Gentle Bittersweet weight of 82 but whose other mood vector values may have a lower correlation to "Gentle Bittersweet" than those of the former recording.

A score field may be an overall relevance score (e.g., the total score for a track), created via a weighted combination of the popularity and similarity scores (as described in further detail below). The relevance score may be what is used to provide the default ordering of tracks displayed in the station library results.

An external identifier field (XID) indicates whether one or more XIDs are available for the selected track. XIDs may be external identifiers for the tracks which can be used to link the track to third party catalogs.

The standard columnar display described above may only display the primary value assigned for each descriptor type. If there are two or more values assigned to the track for the given descriptor type, an indicator of +[count of additional values] may appear to the immediate right of the primary value name. For example if the track has three genres associated with it and the primary genre is Dream Pop, the genre display may appear as "Dream Pop (+2)".

To view the other values assigned, a user may hover over (e.g., mouse-over or other method) the primary value and the other values may appear in an overlay window. Note that this display may not show the weights associated with each descriptor value, just the names of the values themselves.

A user may adjust the station library view by increasing the number of tracks displayed, adjusting the column width, changing the sort order, changing the view from full vector to brief view and vice versa, adjusting the station library size, and so forth.

To expose more tracks for review, a user may drag and drop a rounded tab at the top center of a station library display header. To reduce the number of tracks shown (and thus expose more of the station definition workspace), the user may drag and drop the tab back down.

The width of each station library display column may be adjusted by dragging the right border of the column header.

The sort order of the station library display may be changed by clicking on the column headers. The tracks in the station library may be sorted in the order of the column selected. To reverse the order of the selected sort, a user may click on the column header again.

The default view for both station library and playlist content may be "Full Vectors" where the primary value of each descriptor type may be shown in the appropriate column, and any other values contained in the same vector may be viewed by hovering over the value name as described above.

Alternatively, to simply viewing the track, album, and artist name metadata along with the popularity, similarity, and score values (e.g., without any of the descriptor values shown), a user may click on a gear wheel icon 624 at the right of the station library and playlist results display header 630 to open up a station settings view dialog. In the station settings view dialog the user may change the output format from "Full Vectors" to "Brief". Using the drop-down menu. To return to the full vectors view, a user may select "Full Vectors".

Station Libraries may have a predetermined maximum track count (e.g., 2,000, 500, 5,000, etc.). Stations are populated with as many unique tracks available in the selected catalog that meet the criteria of the station definition.

The curation tool application may provide the ability to export station libraries. In one example, to export a listing of a current station library appearing in a station library and playlist results display (e.g., 600), a user may first confirm that the station library (and not the sequenced playlist) that he wishes to export is displayed in the results display 600. Then the user may select an export icon 626 in the station library and playlist results display header. A dialog interface may appear that allows the user to enter a name for the station library export (e.g., Station Definition Name+ Version #), then select "Export". The listing may be exported as a .TSV file (as an example) and saved to the browser's default, or currently selected, download location, usually the user's "Downloads" folder.

Once a station library has been generated based on the station definition (as described in further detail below), the user may also view example playlists produced from the station library. This provides an opportunity for evaluation and further tuning of the listening experience by adjusting the station definition. The example playlist may also contain up to a predetermined maximum amount of tracks (e.g., 2,000), however, in the playlist the more relevant tracks may appear more than once in rotation, with the default rotation potentially containing only a subset (e.g., 300-400) of the most relevant of the total (e.g., 2,000) tracks available in the station library. For example, there may be specific rules (e.g., DCMA rules, rules specified by a user, etc.) for how often a particular track and/or album or artist may be played (e.g., more popular tracks played more often, a particular track may only be played once every 4 hours, a track by the same artist or the same album only once every 2 hours, etc.).

It is possible for any of the tracks to appear on the play list, but the actual playlist may not have all of the tracks based on the various playlist rules. In one example, the system may choose the five best tracks that are eligible to be played (e.g., that may be played based on the rules) and choose randomly among them.

To review an example playlist generated from the currently selected station library, a user may first click on the gear wheel icon 624 in the station library results header to open up the station settings view dialog. In the station setting view dialog, the user may change the station view radio button to, for example, "Radio Sequence" from the default "Station Library (Rank)".

The station library and playlist results display 600 may now show an example playlist comprised of tracks selected from the station library, ordered in a playout sequence with various rules enforced, such as minimum separation between tracks by the same artist and between the same track. In this view, the leftmost column may change from the default "Rank" 602 value for the underlying station library to the playlist sequence number.

The curation tool application may provide a user the ability to view various pie and bar charts showing the composition of the current playlist. For example, a user may select an option 628 in the station library and playlist results display header 630. By default, charts showing the genre mix may be displayed. The user may select alternate primary descriptor views of the playlist content (e.g., mood, origin, era, artist type, etc.), via a drop-down menu or other method. The categories shown may be at the most granular, or "leaf node" level, regardless of how the user defined the station. For example, if the user defined a station by selecting a single L1 genre of "Blues", the genre chart may actually say "21 Genres" because this is the total count of all "leaf nodes" that are children of "Blues" in the Blues hierarchy. This may cause the distribution shown to be very dispersed, depending on the nature of the station definition.

To export a listing of the current sequenced playlist appearing in the station library and playlist results display 600, a user may first confirm that the example playlist (and not station library) that he wishes to export is displayed in the results display 600. Then the user may select an export icon 626 in the station library and playlist results display header 630. An "Export Tracklist" dialog may appear that allows the user to enter a name for the playlist and a version identifier (ID), and then select "Export". The listing may be exported as a .TSV file (in one example) and saved to the browser's default, or currently selected download location, usually the user's "Downloads" folder.

The curation tool application allows a user to create, save, open, and delete station definitions via a menu items 704 as shown in example display 700. When a user initially launches or opens the curation tool application, it may already be in a new station mode, with no definition elements created. If a user has already set some elements and wishes to start over from scratch, the user may select an option 706 that allows the user to create a new station definition. Selecting the new option 706 may cause all existing definition elements to be cleared.

Figure 8:
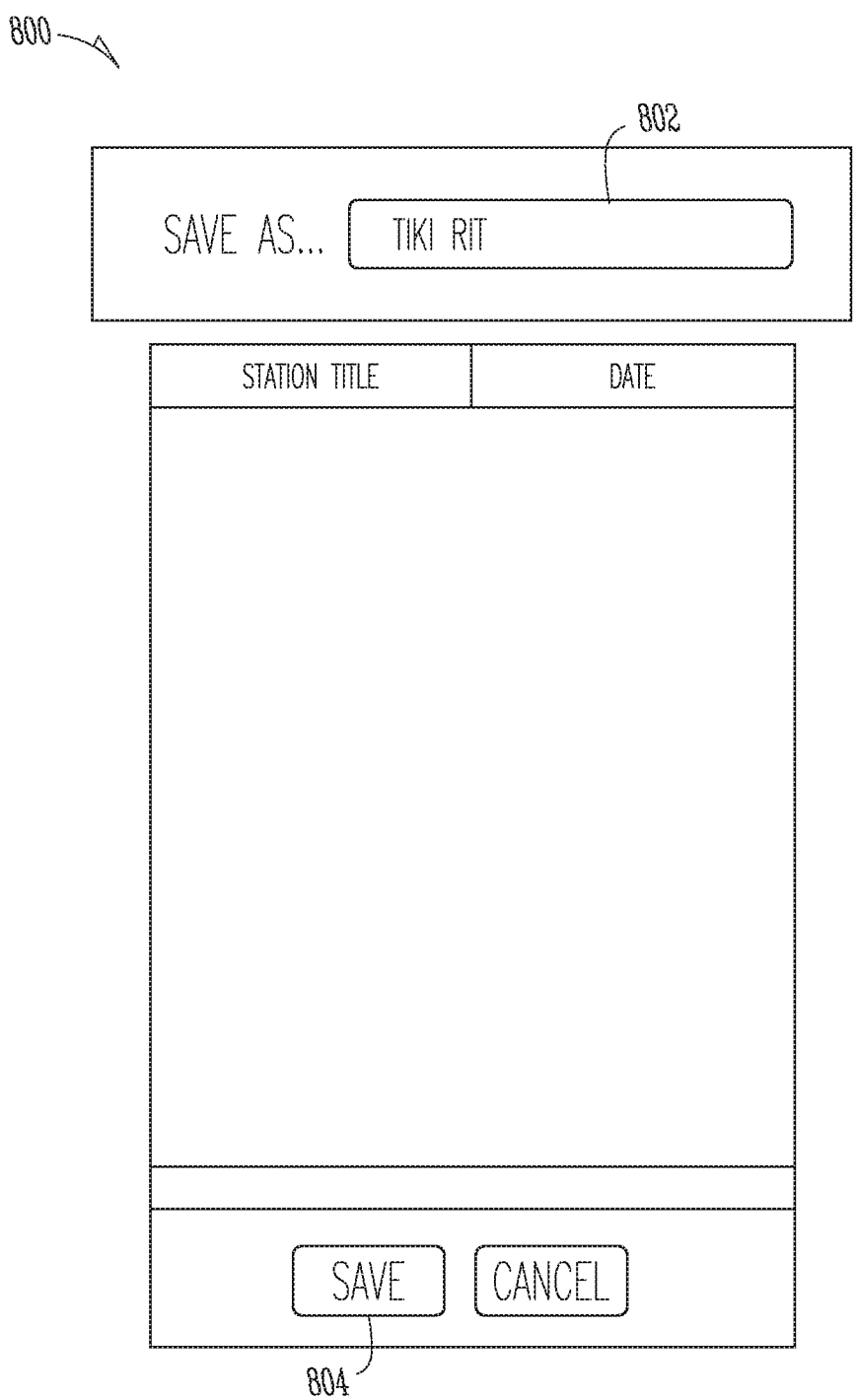
Figure 9:
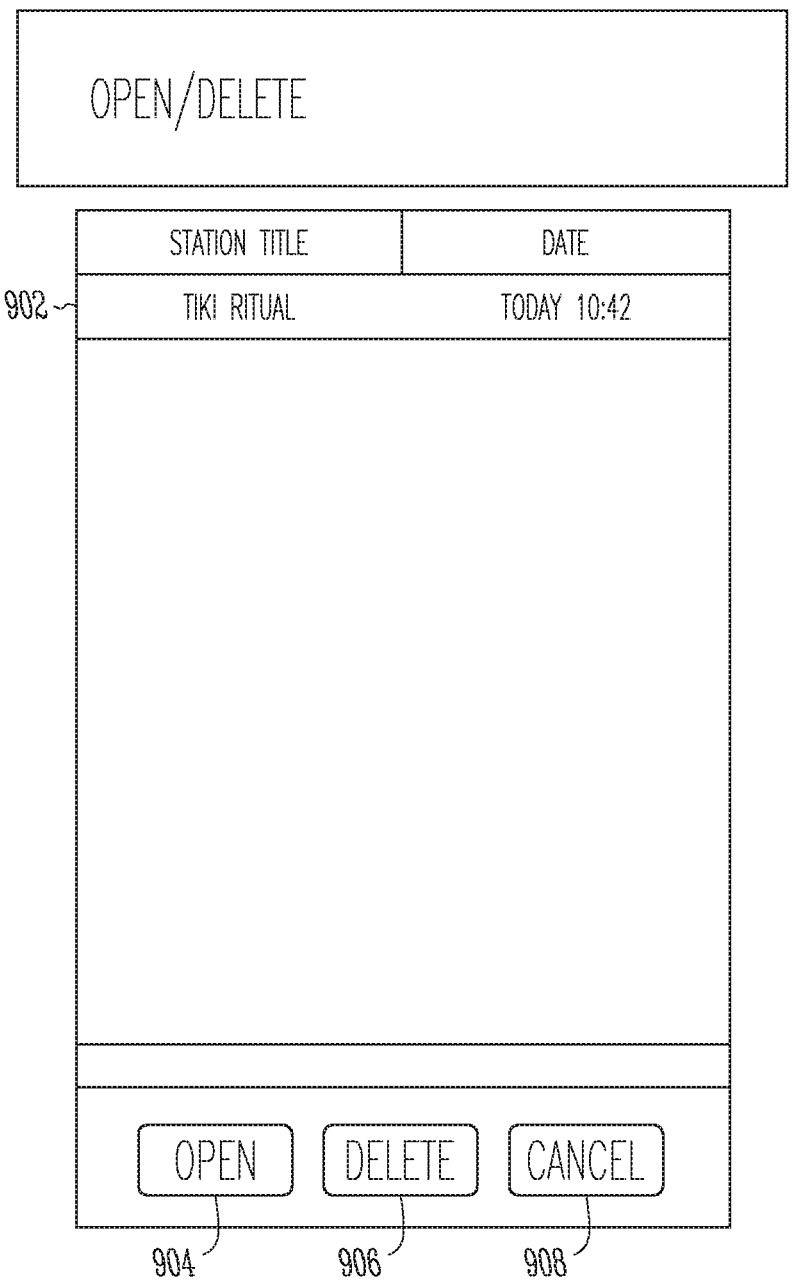

Once a user has defined a station definition to his satisfaction, the user may click on the option "Save As" 708. The curation tool application may then display an interface 800 as shown in FIG. 8 allowing a user to enter information about the station definition (e.g., station name) into the interface 800 such as via text box 802. Once entered, the user may select "Save" 804 in the interface 800. The station name may now appear in the station library results header.

Referring again to FIG. 7, after making edits to an existing station definition, the user may select "Save" 710 to save the updated definition to the same station definition name already established.

A user may select "Open/Delete" 712 to open or delete an existing station definition. The curation tool application may then display an interface such as the example interface 900 shown in FIG. 9. The user may select the station definition (e.g., 902) he wishes to open or delete and then select "open" 904 or "delete" 906 depending on which operation he desires. The interface 900 may also include an option to "Cancel" 908 for the user to cancel the operation to open or delete a station library.

Example embodiments show the user interface of the media curation tool in English and based on a United States regional view. Other regional views may also be provided (e.g., China, Japan, Australia, etc.). A user may choose a different region. For example, if a user chooses Japan as the region, a different hierarchical tree structure for the presentation of the genre categories may be utilized that more closely aligns with the perception of the relative importance and affinities of individual genres to a Japanese music listener. For example, names of categories or greater relevance in Japan (e.g. J-Pop, Enka, Anime Music) may be exposed at a higher level in the hierarchy, whereas categories of lesser relevance in Japan (e.g. Bro Country, Gospel Choir) may be aggregated with similar genres at higher levels and only exposed if the user drills down to lower levels in the hierarchy. Additionally, the genre name labeling terminology, character set and language may also be localized (e.g., to be presented in Japanese or another relevant language depending on the region selected) in addition to the structural localization of the hierarchy.

To generate a station library based on criteria selected by the user, the server system 102 may have access to a master database 126 with a comprehensive collection of media such as various recordings for audio tracks. The user of the curation tool application may be associated with a third party that may only have access to a subset of the master database. For example, the third party may have negotiated rights to access particular media. The third party may have one or more catalogs of media which it may access, based on the licenses or other agreements with record labels, music publishers, content authors, and so forth. The third party may communicate the one or more catalogs to the server system 102 so that the server system 102 may ingest the one or more catalogs associated with the third party. In one example, the server system 102 may create a mapping whereby the tracks in the one or more catalogs of media from the third party may be mapped to the master database 126 so that the server system 102 may determine which audio tracks, for example, may be part of which catalog(s). Each track in the third party catalogs may have an external identifier (XID) that is used by the third party to identify the track. The XID may be stored in the mapping of the third party catalogs in the master database 126. Each third party catalog may have a catalog identifier, which may also be stored in the master database 126.

Figure 10:
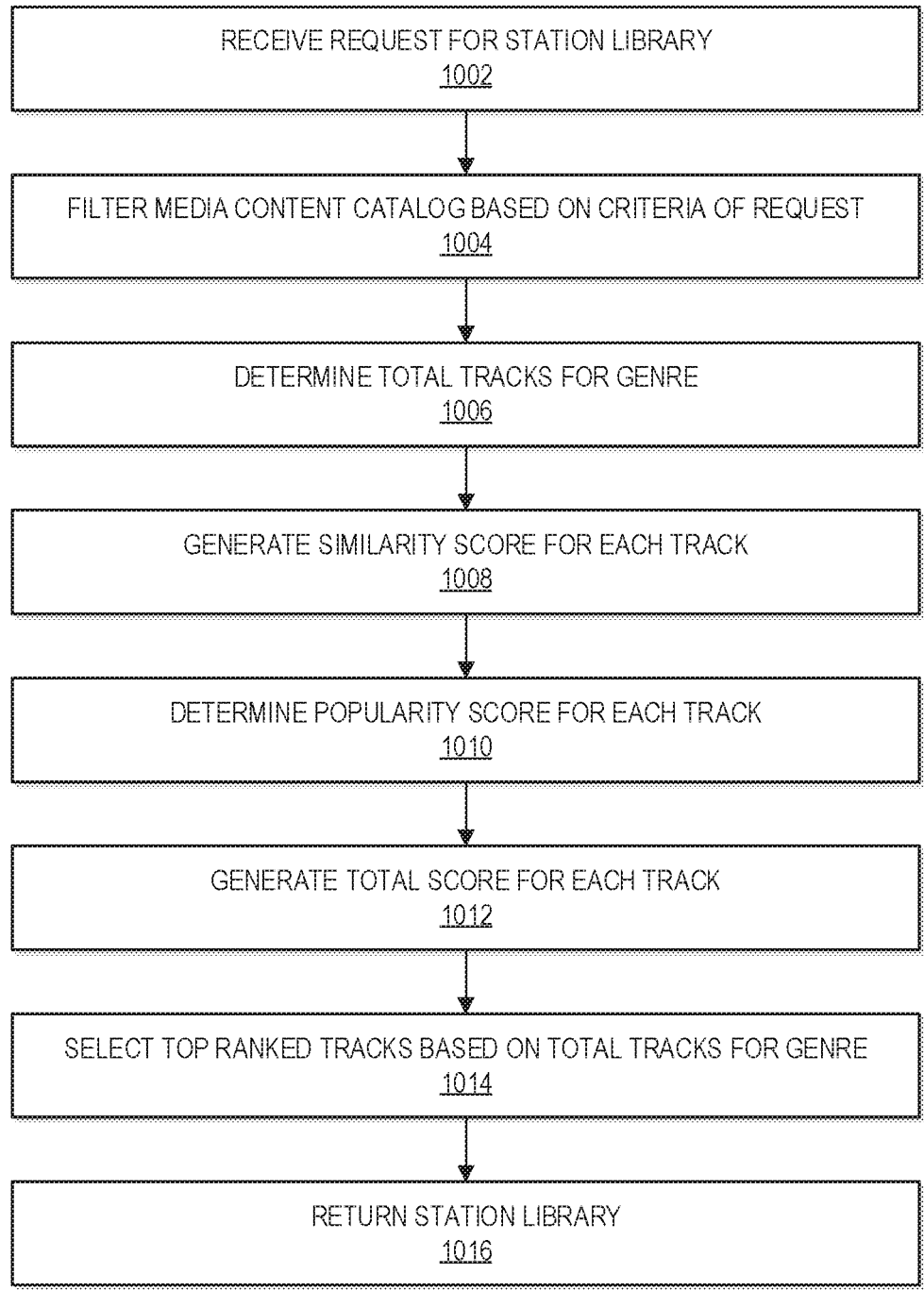
FIG. 10 is a flowchart illustrating aspects of a method, according to some example embodiments.

FIG. 10 is a flow chart illustrating aspects of a method 1000, according to some example embodiments, for generating a station library. For illustrative purposes, method 1000 is described with respect to the networked system 100 of FIG. 1. It is to be understood that method 1000 may be practiced with other system configurations in other embodiments.

At operation 1002, the server system 102 receives a request for a station library. For example, a user may select criteria for a station library via a curation tool application (e.g., client application 114), such as via a user interface of the curation tool application as described above. Each time the user selects or changes criteria for the station library, the client device 110 sends a request to generate a station library to the server system 102 (e.g., via API server 120). In this way the station library is generated and updated in real-time or near real-time as the user is selecting and changing criteria. The request may comprise criteria for the station library. For example, the request may comprise criteria such as one or more of genres, moods, eras, origins, artist types, artist profiles, catalogue identifiers, percent mix, and so forth. In an alternative embodiment, instead of sending a request each time a user selects or changes criteria for a station library, a request may be submitted once the user has completed putting together all of the criteria for the station library.

The server system 102 receives the request and filters one or more media content catalogs based on criteria included in the request, as shown in operation 1004. For example, the server system 102 via API server 120 may receive the request and determine one or more third party catalogs which are associated with the request. The one or more third party catalogs may be determined based on one or more catalog identifiers included in the request, based on a third party identifier from which the API server 120 could determine the one or more catalogs associated with the third party, or other means. The criteria in the request may include at least one genre. The server system 102 (e.g., via curation server 124) may filter the one or more catalogs based on the genre included in the request to generate a first list of candidate tracks for the station library that are associated with that genre (and/or sub-genre, mood, era, origin, artist type, artist profile, etc.). For example, the criteria may include a genre (punk) and an era (1970s). The server system 102 would filter the one or more catalogs to only tracks that are associated with 1970s punk.

At operation 1006, the server system 102 (e.g., via curation server 124) determines a total number of tracks to be selected for the first genre based on the criteria. In one example, there may be a predetermined maximum number of tracks for a station library. For illustration purposes we will use a predetermined maximum number of 2000 tracks. If there is only one genre included in the criteria, then the total number of tracks to be selected for the genre will be 2000. If there is more than one genre, the predetermined total number of tracks will be equally divided between genres if there is no percent mix specified in the request. For example, if there are two genres specified in the criteria (e.g., punk and indie) the total number of tracks to be selected for each genre would be 1000 (e.g., 50% for punk and 50% for indie). In another example, the user may specify a percent mix for each genre. For example, the user may specify 75% for a first genre (e.g., punk) and 25% for a second genre (e.g., pop). The criteria in the request may include the percent mix. Thus, the total number of tracks to be selected for the first genre would be 1500 and the total number of tracks to be selected for the second genre would be 500.

In operation 1008, the server system 102 generates a similarity score for each track of the first list of candidate tracks. The similarity score may be determined by comparing the criteria included in the request with qualities of each track in the first list of candidate tracks to come up with a similarity score for each track. Example algorithms for generating a similarity score are described in further detail below.

In operation 1010, the server system 102 (e.g., via curation server 124) determines a popularity score for each track of the first list of candidate tracks. The popularity score may be based on how many times an album with the track is searched for by users, how many times users recognize a song using fingerprint technology, music charts data for popular songs, and so forth. The popularity score may be determined in advance and associated with the track. For example, it may be stored with details for the track in one or more databases 126, and the curation server 124 may determine the popularity score by accessing the one or more database 126 to get the popularity score associated with each track in the first list of candidate tracks.

In operation 1012, the server system 102 (e.g., via curation server 124) generates a total score for each track by combining the similarity score and popularity score for each track of the first list of candidate tracks. In one example, the total score may be a weighted combination/sum based on a predetermined weight for the similarity score and a predetermined weight for the popularity score. For example, the predetermined weight for similarity score may be 25% and the predetermined weight for popularity score may be 75%, and thus the calculation of the total score would be 0.25*similarity score+0.75*popularity score. Using this example, if the similarity score is 904 and the popularity score is 387, the total score would be 516.25 (e.g., 0.25*904+0.75*387=516.25). The total score may be rounded to the nearest whole number. Thus, for this example the total score would be 516.

In operation 1014, the server system 102 (e.g., via curation server 124) selects the top ranked tracks for the first list of candidate tracks based on the total number of tracks to be selected for the first genre to generate a list of top ranked tracks for the genre. For example, the server system 102 may rank the first list of candidate tracks based on the total score for each track, and then take the top ranked tracks in the ranked list. For example, if the total number of tracks to be selected is 500, the server system 102 would take the top ranked 500 tracks (e.g., the 500 tracks with the highest total scores). In operation 1016, the server system 102 returns the list of top ranked tracks of the first genre as part of the station library. If there is only one genre, then the server system 102 returns the station library containing the top ranked tracks for the genre.

If there is more than one genre included in the criteria of the request, then the server system 102 generates a list of top ranked tracks for each genre. For example, the request may comprise criteria including a second genre. As described above, the server system 102 may filter at least one media catalog based on the criteria for the station library to generate a second list of candidate tracks for the station library. The server system 102 may determine the total number of tracks to be selected for the second genre based on the criteria. The server system 102 may generate a similarity score for each track of the second list of candidate tracks and determine a popularity score for each track of the second list of candidate tracks. The server system 102 may combine the similarity score and popularity score for each track of the second list of candidate tracks to generate a total score for each track of the second list of candidate tracks.

The server system 102 may select the top ranked tracks of the second list of candidate tracks based on the total number of tracks to be selected for the second genre to generate a list of top ranked tracks for the second genre. For example, the server system 102 may rank the second list of candidate tracks based on the total score for each track.

If there are other genres, similar steps will be taken for each genre. In some cases, there may not be enough tracks in the current catalog to meet the number of tracks to be selected for a particular genre. For example, the user may specify 50% old school punk, but the current catalog may only contains 810 old school punk tracks (instead of the 1000 to be selected). In one example embodiment, this may be addressed by taking the leftover amount to be selected (e.g., 290) and re-distributing to other selections according to the ratio selected by the user. For example, if the user chose 50% old school punk, 25% indie, and 25% alternative, the 810 would be redistributed to indie and alternative (e.g., 145 to indie and 145 to alternative since the percent mix for each is the same).

The server system 102 may combine the list of top ranked tracks for the first genre with the list of top ranked tracks for the second genre (and any other genre), and then return the station library that includes the list of top ranked tracks for the first genre and the list of top ranked tracks for the second genre (and the list of top ranked tracks for each of any further genres). The station library list may be displayed in the user interface sorted in order of total score, regardless of the genre. The station library list may comprise a list of tracks and at least one descriptor such as rank, title, artist, artist type, album, genre, mood, era, origin, popularity score, similarity score, total score, one or more catalog identifiers, one or more external identifiers, and so forth.

As explained above, the server system 102 may have access to a master database 126 with a comprehensive collection of media such as various recordings for audio tracks. Data related to the media may include descriptive data (also referred to herein as descriptors or qualities) that may be assigned to both artists and tracks. Descriptor values may have a unique identifier and label. There may be thousands of unique music descriptor values, for example, in the server system 102 (e.g., stored in one or more databases 126). For example, artists may have one or more genres, eras, artist types, origins, and so forth. In one example, an artist may have an example identifier for a "Retro Soul" genre of 2963, an example identifier for "Late 2000's" era of 2653, an example identifier "Female Solo—Solo Vocal" artist type of 2656, an example identifier for "Wales" origin of 4285, and so forth. In another example, tracks may have all of the above (e.g., genre, era, artist type, origin, etc.) and also moods (e.g., 34205 for "Dark Romantic Lively Rhythm"), tempos (e.g., 102130 for "130s"), and so forth. In one example, out of all of the descriptor types, only genre may be mandatory for a similarity calculation. The similarity calculation may handle missing descriptions of other types (e.g., eras, artist types, origins, moods, tempos, etc.).

Artists and tracks may have one or more of certain types of descriptors assigned. This is referred to herein as a vector. Vectors may consist of an array of one or more descriptor-weight pairs. For example, an era vector for the "Beastie Boys" may comprise:

| Type | ID | Weight | Label |
|---|---|---|---|
| ERA | 2645 | 40 | 1990's |
| ERA | 2641 | 32 | 1980's |
| ERA | 2650 | 14 | 2000's |
| ERA | 34814 | 14 | Early 2010's |

The data in this vector tells us that the Beastie Boys were active from the 80's until the 2010's, with their most significant period of activity being in the 90's. The vector element with the highest weight may be referred to as the primary value. In this example, the Beastie Boys' primary era is the 90s. Weights in a vector may usually, but not always, add up to 100.

As another example, a vector with all of the descriptors for Echo & the Bunnymen may comprise:

| Type | ID | Weight | Label |
|---|---|---|---|
| ATYPE | 23710 | 100 | Male Group - Solo Vocal |
| ERA | 2641 | 32 | 1980's |
| ERA | 34814 | 19 | Early 2010's |
| ERA | 2650 | 19 | 2000's |
| ERA | 2645 | 19 | 1990's |
| ERA | 2640 | 11 | Late 70's |
| GENRE | 2740 | 48 | Original Post-Punk |
| GENRE | 2748 | 26 | Neo-Psychedelic |
| GENRE | 19042 | 26 | Pre-Grunge Alternative Rock |
| ORIGIN | 4583 | 100 | Liverpool |

Vectors may be sorted by weight, as shown in this example. From this table we can see that Echo & The Bunnymen are a male group with solo vocals, formed in Great Britain in the late 70's, and active up until now. Their primary genre is "Original Post-Punk", and their primary era is the 80's.

Below is a table showing the descriptors for the track "The District Sleeps Alone Tonight" by The Postal Service.

| Type | ID | Weight | Label |
|---|---|---|---|
| ATYPE | 23719 | 100 | Mixed Group - Male Solo Vocal |
| ERA | 2650 | 100 | 2000's |
| GENRE | 2755 | 75 | Techno Pop |
| GENRE | 2763 | 25 | Indie Pop |
| MOOD | 34182 | 21 | Deep Dreamy Relaxing Beat |
| MOOD | 34188 | 9 | Lite Melancholy |
| MOOD | 34179 | 9 | Light Soft Soulful |
| MOOD | 34181 | 7 | Soft Sensual/Intimate |
| MOOD | 34180 | 5 | Lite Glossy Sensual Groove |
| MOOD | 34184 | 5 | Enigmatic/Brooding/Mysterious |
| MOOD | 34371 | 5 | Energetic Emo-Yearning |
| MOOD | 34205 | 4 | Dark Romantic Lively Rhythm |
| MOOD | 34400 | 4 | Idealistic/Stirring |
| MOOD | 34191 | 3 | Determined/Bitter/Serious/Jaded |
| ORIGIN | 4440 | 100 | Los Angeles |
| TEMPO_MAIN | 102154 | 99 | 150's |
| TEMPO_MAIN | 102077 | 79 | 70's |
| TEMPO_MAIN | 102303 | 40 | 300+ |

Within a given type of descriptor, correlate values may exist for each unique pair or descriptors. The correlate value is a measure of "closeness" between the two descriptors, and range within a theoretical maximum of −1,000 (opposite) to 1,000 (identical). Some example correlates may include:

| Type | Descriptor 1 | Correlation | Descriptor 2 |
|---|---|---|---|
| GENRE | 2942 - Neo Soul | 750 | 2963 - Retro Soul |
| GENRE | 2717 - Classic New York Punk | 300 | 2793 - Psychobilly |
| ERA | 2601 - 1960's | −50 | 34807 - 2010's |
| ORIGIN | 4440 - Los Angeles | 750 | 4446 - San Francisco |
| ORIGIN | 4440 - Los Angeles | 563 | 4508 - New York City |
| ORIGIN | 4440 - Los Angeles | 350 | 4583 - Liverpool |

For description pairs that do not have a correlate value defined in the data, a correlation value of 0 may be assumed.

An example similarity algorithm will now be described that takes all of the descriptors of two items (e.g. the station definition and a candidate track) and derives a single similarity value (e.g., between −1000 to 1000) between them. In one example the similarity score may be determined by comparing criteria included in a request for a station library (as a first item) with qualities of each track (as a second item) in a list of candidate tracks to come up with a similarity score for each track, as explained above.

The algorithm is a multi-step process consisting of a number of different value lookups and computations. The algorithm utilizes correlates and vector similarity to get the most out of the rich and fine-grained nature of descriptive data. For example, two artists most listeners would consider similar might have different (but highly correlating) primary genres. If one were to look for artists that are similar to the Pet Shop Boys (Primary Genre: 2756—Synth Pop) just on the primary genre alone, then one would miss both OMD and Tears For Fears (Primary Genre for both: 2752—New Romantic).

Figure 11:
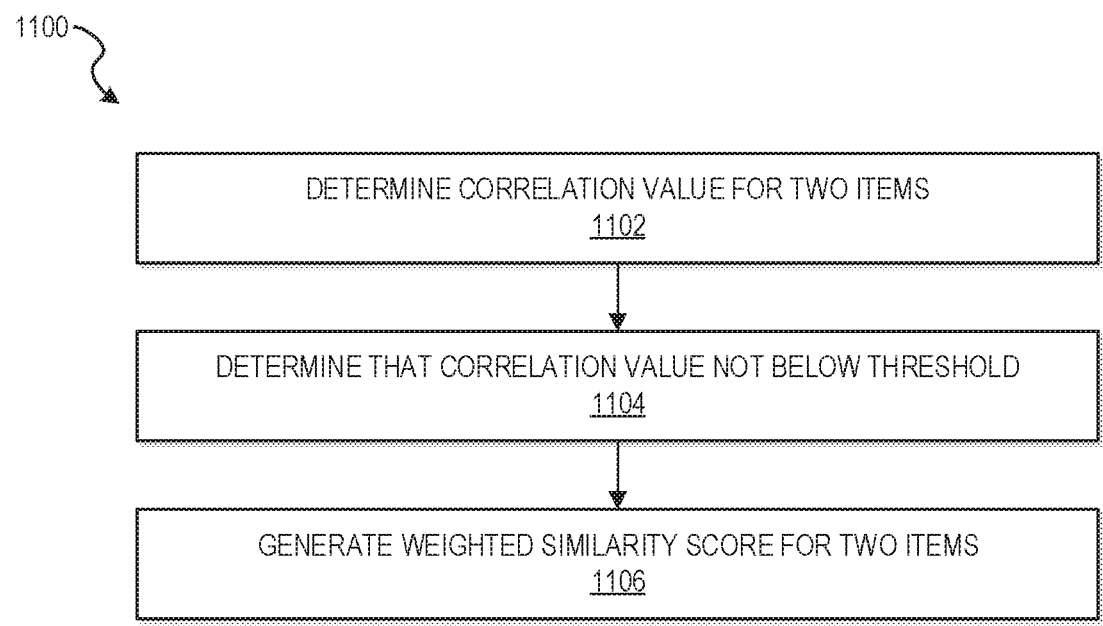
FIG. 11 is a flowchart illustrating aspects of a method, according to some example embodiments.

FIG. 11 is a flow chart illustrating aspects of method 1100 according to some example embodiments, for generating a similarity score. For illustrative purposes, method 1100 is described with respect to the networked system 100 of FIG. 1. It is to be understood that method 1100 may be practiced with other system configurations in other embodiments.

In one example embodiment, the similarity algorithm may be a two-step process. The first step is a quick pass/fail type of check based on how strongly the two items' primary genres (and if available, primary moods) correlate. If the correlation value for either of these is below a specified threshold, then the result of the first step is fail, the similarity algorithm ends, and the similarity score between the two items is considered to be 0. In one example, a specified threshold for a primary genre may be 350. In another example, (e.g., for a track) a specified threshold for a primary mood comparisons may be −160.

Accordingly, the server system 102 (e.g., via curation server 124) determines a correlation value for two items, as shown in operation 1102. The two items may be a station library and a track, two artists, two tracks, and so forth. In one example, the first item may be criteria for a station library and the second item may be a track.

For example, the server system 102 may access a correlation table (as explained above) in one or more databases 126 to look up the correlation value between the primary genres of the two items (e.g. a genre specified in criteria for a station library and a genre for a track). If the correlation value is below a specified threshold, the similarity algorithm ends and the similarity score between the two items is considered 0. If both of the items also have a primary mood, the server system 102 may access the correlation table to look up the correlation between the primary moods of the two items. If the correlation value is below a specified threshold, the similarity algorithm ends and the similarity score between the two items is considered 0.

At operation 1104, the server system 102 determines that the correlation value is not below the specified threshold if the correlation value for genre (and mood, if applicable) is not below the specified threshold. Thus, if the first step was passed, a weighted similarity score is computed at step two. A pseudo-code example of the two step similarity calculation process may comprise:

```
Step 1:
  Look up correlation between primary genres of the two items.
    If below genre correlation threshold:
      Similarity = 0
      Exit
    If both items have primary mood, look up correlation between these
      If below mood correlation threshold:
        Similarity is 0
        exit
  Step 1 passed, proceed to Step 2
Step 2:
  Compute weighted similarity score
    Similarity = weighted similarity score
    Exit
```

At operation 1106, the server system 102 generates a weighted similarity score. For the weighted similarity score, the similarity of each of the different descriptor types is computed, and then combined based on weights assigned to types.

A pseudo-code example for computing a weighted track similarity score (e.g., criteria for a station library to track similarity) may comprise:

```
station_library_to_track_similarity_score =
  (50 * mood_similarity +
  40 * genre_similarity +
  5 * era_similarity +
  3 * origin_similarity +
  2 * artisttype_similarity) / 100;
```

The weighted algorithm may be tolerant of one or more items not containing a particular type of descriptor. In this case, the division in the computation may be adjusted to account for the missing type's weight. For example if a station library and track are compared and the mood is missing for either one of them, then the sum of genre, era, origin, and artist type similarity should be divided by 50 instead of 100.

Next, how to compute these individual similarities is described. In this example, the station definition and the descriptors assigned to tracks come in the form of vectors (as described above), and thus, the similarity between these are computed using a vector similarity algorithm.

The vector similarity is an iterative process to derive a single similarity score between two descriptor vectors of the same type. In sum, the server system 102 determines the pair of elements in the two vectors (e.g., one element from each) that have the highest correlation to each other. Once that is determined, the server system 102 allocates the weights from this correlation to the overall score. For example, the server system 102 may add the product of the correlation value and the common weight of the correlation to the running score sum kept by the server system 102, and the common weight is added to the allocated weight sum. This process is repeated, until all of the weights in either vector are allocated. The correlation sum is then divided by the allocated weight sum to arrive at the vector similarity value.

To begin with a simple example, the genre similarity between a station definition comprised of 2 genres and a track by Elliot Smith will be computed. The following table shows the station definition genre vector:

| Type | ID | Weight | Label |
|---|---|---|---|
| GENRE | 2780 | 64 | Alternative Singer-Songwriter |
| GENRE | 2781 | 36 | Experimental Rock |

The following tables shows the Elliot Smith track's genre vector:

| Type | ID | Weight | Label |
|---|---|---|---|
| GENRE | 2780 | 56 | Alternative Singer-Songwriter |
| GENRE | 71063 | 44 | Indie Folk |

The server system 102 determines the correlation values between the genres of the two items. For example, the server system 102 may access a correlation table (as explained above) in on or more databases 126 to look up the correlation value between the genres of the two items. The server system 102 may sort the correlation values between the genres of the two items from highest to lowest:

2780~2780=950

2780~71063=600

2781~2780=0

2781~71063=0

The server system 102 determines the pair of genres with the highest correlation. In this example, the highest correlation is genre 2780 and genre 2780, as both the station definition and the track have the same primary genre. The "common weight" between these is the lower of the two weights (e.g., 56). The server system 102 allocates the weight (e.g., adds the correlation and the common weight to the sums), and removes the allocated weights from the vectors. The result may comprise:

| Station Definition genre vector | | | |
|---|---|---|---|
| Type | ID | Weight | Label |
| GENRE | 2780 | 8 | Alternative Singer-Songwriter |
| GENRE | 2781 | 36 | Experimental Rock |

| Elliot Smith Track genre vector | | | |
|---|---|---|---|
| Type | ID | Weight | Label |
| GENRE | 2780 | 0 | Alternative Singer-Songwriter |
| GENRE | 71063 | 44 | Indie Folk |

The sum after the first step is 53200 (e.g., 950*56=53200). The common weight of 56 is allocated, and so the weightsum is 56. Accordingly, the Station Definition has a weight of 8 left for genre 2780, whereas the Elliott Smith track's entire weight for genre 2780 was consumed.

The server system 102 repeats this process for each genre pair. For example, the server system 102 determines the next pair with the highest correlation. In this example, this is 2780 and 71063, with a correlation of 600, and the common weight is 8. Once allocated and added up, we end up with:

| Station Definition genre vector | | | |
|---|---|---|---|
| Type | ID | Weight | Label |
| GENRE | 2780 | 0 | Alternative Singer-Songwriter |
| GENRE | 2781 | 36 | Experimental Rock |

| Elliot Smith track genre vector | | | |
|---|---|---|---|
| Type | ID | Weight | Label |
| GENRE | 2780 | 0 | Alternative Singer-Songwriter |
| GENRE | 71063 | 36 | Indie Folk |

The server system 102 adds 4800 (e.g., 600*8=4800) to the sum to get 58000, and 8 to the weightsum to get 64. The process is repeated once again for the next highest correlation, which is the only one left now with unallocated weights (2781, 71063), with a correlation of 0, and a common weight of 36. Once allocated, the result comprises:

| Station Definition genre vector | | | |
|---|---|---|---|
| Type | ID | Weight | Label |
| GENRE | 2780 | 0 | Alternative Singer-Songwriter |
| GENRE | 2781 | 0 | Experimental Rock |

| Elliot Smith Track genre vector | | | |
|---|---|---|---|
| Type | ID | Weight | Label |
| GENRE | 2780 | 0 | Alternative Singer-Songwriter |
| GENRE | 71063 | 0 | Indie Folk |

The sum remains unchanged at 58000 and the weightsum is 100 (64+36).

Now, there are no more unallocated weights left in either vector. (Though in most cases both vectors will have no unallocated weights left at the end of the iterations, technically the iterations are complete when either vector has no more unallocated weights.) The server system 102 calculates the vector similarity by dividing the sum by the weightsum. Accordingly, the genre similarity between the Station Definition and the Elliott Smith track is 58000/100=580.

The algorithm may be the same, no matter how many elements the compared vectors have, or what types of descriptor vectors are being compared, with one notable exception of mood. Mood adds a slight modification to the algorithm.

Mood vectors may be a bit different from other vectors, in that their weights frequently may not add up to 100, but may add up to less than 100. This is because the mood vector may actually only contain, for example, the top ten most strongly weighted available mood values for each track, out of a total number (e.g., 101) available mood values for each track. If the vector similarity algorithm is applied as described above, it may lead to a mood similarity score that is disproportionately far in either the "similar" or "different" direction. Because of this, for mood vector similarity, the unallocated (or unknown) weights are taken into consideration, with an assumed correlation sum of half of the allocated weights' correlation sum. This effectively pulls the similarity score towards zero, particularly if there is a large portion of the weights unallocated.

The following is an example mood vector similarity calculation and output between two mood vectors:

As can be seen above, after 14 iterations of the allocations, we ended up with an allocated weightsum of only 74. To account for the missing weightsum of 26, we assume a correlation sum of 197 (half of 395, in integer arithmetic), and incorporate both sets (known and unknown) into the final score, according to their weights. The result is ((395*74)+(197*26))/100=343.

In sum, to compute the music similarity between two items is a two-step process. Step one is a quick comparison of primary genre (and for tracks, both primary genre and primary mood). If step one fails, the similarity score is 0. If step one is passed, then a more in-depth weighted similarity score is computed. For the components of the weighted score, which are based on vectors (e.g., genre, era, mood), the vector similarity algorithm is used, and for mood vector similarity only, we take the "unknown weights" into consideration.

Some example output showing the entire process will next be described.

The following is an example similarity calculation comparing an Indie-Pop Station Definition to a track by The Ladybug Transistor:

```
Computing MOOD similarity:
 0. 34212/39 (950) 34212/3
Sum=2850, Weightsum=3
 1. 34373/28 (950) 34373/5
Sum=7600, Weightsum=8
 2. 34201/6 (950) 34201/3
Sum=10450, Weightsum=11
 3. 34387/3 (950) 34387/17
Sum=13300, Weightsum=14
 4. 34203/1 (750) 34411/3
Sum=14050, Weightsum=15
 5. 34201/3 (700) 34411/2
Sum=15450, Weightsum=17
 6. 34388/3 (600) 34391/5
Sum=17250, Weightsum=20
 7. 34212/36 (400) 34389/20
Sum=25250, Weightsum=40
 8. 34180/2 (300) 34170/7
Sum=25850, Weightsum=42
 9. 34212/16 (200) 34387/14
Sum=28650, Weightsum=56
10. 34373/23 (200) 34399/8
Sum=30250, Weightsum=64
11. 34373/15 (200) 34391/2
Sum=30650, Weightsum=66
12. 34373/13 (100) 34170/5
Sum=31150, Weightsum=71
13. 34212/2 (-600) 34384/3
Sum=29950, Weightsum=73
14. 34201/1 (-700) 34384/1
Sum=29250, Weightsum=74
-------------------
 Known = 395 /74
 Unknown =197/26
===================
Result = 343
```

```
Name="Indie Pop Focus" Station Definition
GOETs (6):
 1. Type=ATYPE, ID=2662, Weight=100, Name=Mixed Group - Mixed
 Duo/Group Vocal
 2. Type=ERA, ID=2650, Weight=64, Name=2000's
 3. Type=ERA, ID=34814, Weight=36, Name=Early 2010's
 4. Type=GENRE, ID=2763, Weight=64, Name=Indie Pop
 5. Type=GENRE, ID=2765, Weight=36, Name=Chamber Pop
 6. Type=ORIGIN, ID=4401, Weight=100, Name=Montreal
ID=149069
Name=Track by The Ladybug Transistor
GOETs (6):
 1. Type=ATYPE, ID=2662, Weight=100, Name=Mixed Group -
 Mixed Duo/Group Vocal
 2. Type=ERA, ID=2650, Weight=75, Name=2000's
 3. Type=ERA, ID=34814, Weight=36, Name= Early 2010's
 4. Type=GENRE, ID=2764, Weight=75, Name=Baroque Pop
 5. Type=GENRE, ID=2763, Weight=25, Name=Indie Pop
 6. Type=ORIGIN, ID=4509, Weight=100, Name=Brooklyn
STEP 1: 2763 (775) 2764 >= 350 -> PASS
STEP 2: (Genre=60 Era=20 Origin=10 Artist Type=10)
Computing GENRE similarity:
0. 2763/64 (900) 2763/25
Sum=22500, Weightsum=25
1. 2765/36(900) 2764/75
Sum=54900, Weightsum=61
2. 2763/39 (775) 2764/39
Sum=85125, Weightsum=100
--------------------
Known = 851 / 100
==================
Result = 851
Computing ERA similarity:
0. 2650/64 (935) 2650/75
Sum=59840, Weightsum=64
1. 34814/36 (935) 2650/11
Sum=70125, Weightsum=75
2. 34814/25 (680) 2648/25
Sum=87125, Weightsum=100
--------------------
Known = 871 / 100
==================
Result = 871
Computing ORIGIN similarity:
SINGLE: 4401 (765) 4509
Computing ARTIST TYPE similarity:
SINGLE: 2662 (975) 2662
RESULT:
Step1 = PASS
Step2:
 * Genre = 851
 * Origin = 765
 * Era = 871
 * Artist Type = 975
 * Weighted = 858
==================
SIMILARITY = 858
```

Step one is passed, since the correlation between the primary genres is high enough (e.g., 775). The similarity score then is the result of the weighted similarity computation, which includes the genre and era vectors, and the simple origin and artist type correlations.

The following is an example artist similarity calculation comparing a "Serious Synth Pop" Station Definition to a track by Nine Inch Nails:

```
GOETs (11):
 1. Type=ATYPE, ID=2660, Weight=100, Name=Male Group -
 Duo/Group Vocal
 2. Type=ERA, ID=2644, Weight=49, Name=Late 80's
 3. Type=ERA, ID=2645, Weight=17, Name=1990's
 4. Type=ERA, ID=2650, Weight=17, Name=2000's
 5. Type=ERA, ID=2641, Weight=17, Name=1980's
```

```
  6. Type=GENRE, ID=2756, Weight=44, Name=Synth Pop
  7. Type=GENRE, ID=2700, Weight=14, Name=Alternative Dance
  8. Type=GENRE, ID=23672, Weight=14, Name=Darkwave
  9. Type=GENRE, ID=2752, Weight=14, Name=New Romantic
  10. Type=GENRE, ID=2741, Weight=14, Name=Brit Rock
  11. Type=ORIGIN, ID=4578, Weight=100, Name=England
Name=Track by Nine Inch Nails
GOETs (7):
  1. Type=ATYPE, ID=2655, Weight=100, Name=Male Solo - Solo
  Vocal
  2. Type=ERA, ID=2645, Weight=60, Name=1990's
  3. Type=ERA, ID=2650, Weight=20, Name=2000's
  4. Type=ERA, ID=2644, Weight=20, Name=Late 80's
  5. Type=GENRE, ID=2694, Weight=75, Name=Industrial Dance
  6. Type=GENRE, ID=2698, Weight=25, Name=Alternative Rock
  7. Type=ORIGIN, ID=4521, Weight=100, Name=Cleveland
STEP 1: 2756 (0) 2694 < 350 -> FAIL
STEP 2: (Genre=60 Era=20 Origin=10 Artist Type=10)
Computing GENRE similarity:
  0. 23672/14 (850) 2694/75
  Sum=11900, Weightsum=14
  1. 2741/14 (650) 2698/25
  Sum=21000, Weightsum=28
  2. 2700/14 (600) 2698/11
  Sum=27600, Weightsum=39
  3. 2756/44 (0) 2694/61
  Sum=27600, Weightsum=83
  4. 2700/3 (0) 2694/17
  Sum=27600, Weightsum=86
  5. 2752/14 (0) 2694/14
  Sum=27600, Weightsum=100
  --------------------
  Known = 276 / 100
  ====================
  Result = 276
Computing ERA similarity:
  0. 2644/49 (970) 2644/20
  Sum= 19400, Weightsum=20
  1. 2645/17 (935) 2645/60
  Sum=35295, Weightsum=37
  2. 2650/17 (935) 2650/20
  Sum=51190, Weightsum=54
  3. 2644/29 (798) 2645/43
  Sum=74332, Weightsum=83
  4. 2641/17 (680) 2645/14
  Sum=83852, Weightsum=97
  5. 2641/3 (630) 2650/3
  Sum=85742, Weightsum=100
  --------------------
  Known = 857 / 100
  ====================
  Result = 857
Computing ORIGIN similarity:
  SINGLE: 4578 (356) 4521
Computing ARTIST TYPE similarity
  SINGLE: 2660 (475) 2655
RESULT:
  Step1 = FAIL
  Step2:
   * Genre = 276
   * Origin = 356
   * Era = 857
   * Artist Type = 475
   * Weighted = 420
  ====================
SIMILARITY = 0
```

As can be seen above, step one failed, since the primary genres are too dissimilar. The weighted similarity score computation is shown just for completeness; it is not necessary to do it when step one fails. In one example embodiment, no matter what the weighted similarity score is, the final similarity score will always be 0, if step one fails.

The following is an example track similarity calculation comparing an "Edgy Urban Crossover" Station Definition and the Track "What You Waiting For" by Gwen Stefani. This example incorporates the mood attribute into the station definition.

```
Name="Edgy Urban Crossover" Station Definition
GOETs (14):
 1. Type=ATYPE, ID=2656, Weight=100, Name=Female Solo -
Solo Vocal
 2. Type=ERA, ID=2652, Weight=60, Name=Mid 2000's
 3. Type=ERA, ID=2653, Weight=20, Name=Late 2000's
 4. Type=ERA, ID=34814, Weight=20, Name=Early 2010's
 5. Type=GENRE, ID=19002, Weight=53, Name=Urban Crossover
R&B
 6. Type=GENRE, ID=2853, Weight=29, Name=Dance Pop
 7. Type=GENRE, ID=19041, Weight=18, Name=Dancehall:
Singer
 8. Type=MOOD, ID=34213, Weight=91, Name=Dark Intense Pop
Determination
 9. Type=MOOD, ID=34182, Weight=1, Name=Deep Dreamy
Relaxing Beat
 10. Type-MOOD, ID=34398, Weight=1, Name=Edgy / Sexy
 11. Type=ORIGIN, ID=4004, Weight=100, Name=Barbados
Name= Track "What You Waiting For?" by Gwen Stefani
GOETs (9):
 1. Type=ATYPE, ID=2656, Weight=100, Name=Female Solo -
Solo Vocal
 2. Type=ERA, ID=2652, Weight=100, Name=Mid 2000's
 3. Type=GENRE, ID=2853, Weight=100, Name=Dance Pop
 4. Type=MOOD, ID=34213, Weight=96, Name=Dark Intense Pop
Determination
 5. Type=MOOD, ID=34393, Weight=1, Name=Arousing /
Energizing Groove
 6. Type=ORIGIN, ID=4447, Weight=100, Name=Orange County
STEP 1: 19002 (700) 2853 >= 350 -> Compare MOOD
STEP 1: 34213 (950) 34213 >= -160 -> PASS
STEP 2: (Genre=40 Mood=50 Era=5 Origin=3 Artist Type=2)
Computing GENRE similarity:
 0. 2853/29 (925) 2853/100
Sum=26825, Weightsum=29
 1. 19002/53 (700) 2853/71
Sum=63925, Weightsum=82
 2. 19041/18 (0) 2853/18
Sum=63925, Weightsum=100
--------------------
Known = 639 / 100
====================
Result = 639
Computing MOOD similarity:
 0. 34213/91 (950) 34213/96
Sum=86450, Weightsum=91
 1. 34398/1 (300) 34393/1
Sum=86750, Weightsum=92
 2. 34182/1 (-700) 34213/5
Sum=86050, Weightsum=93
--------------------
Known = 925 / 93
Unknown = 462 / 7
====================
Result = 892
Computing ERA similarity:
 0. 2652/60 (970) 2652/100
Sum=58200, Weightsum=60
 1. 34814/20 (935) 2652/40
Sum=76900, Weightsum=80
 2. 2653/20 (890) 2652/20
Sum=94700, Weightsum=100
--------------------
Known = 947 / 100
====================
Result = 947
Computing ORIGIN similarity:
 SINGLE: 4004 (225) 4447
Computing ARTIST TYPE similarity:
 SINGLE: 2656 (975) 2656
```

```
RESULT:
 Step1 = PASS
 Step2:
  * Genre = 639
  * Origin = 225
  * Era = 947
  * Artist Type = 975
  * Mood = 892
  * Weighted = 775
 ===================
 SIMILARITY = 775
```

Step one was passed since the primary genre correlation is 700 (e.g., greater than example specified threshold 350), and both the station definition and the candidate track have the same primary mood, with a correlation of 970 (e.g., greater than the example specified threshold −160), so we compute the weighted score, which will become the final similarity score.

The following is an example similarity calculation comparing the station definition "Neo-Lounge Nitecap" to the candidate track "High Noon" by Kruder & Dorfmeister.

```
Name="Neo-LoungeNitecap" Station Definition
GOETs (25):
 1. Type=ATYPE, ID=2662, Weight=100, Name=Mixed Group -
 Mixed Duo/Group Vocal
 2. Type=ERA, ID=2650, Weight=60, Name=2000's
 3. Type=ERA, ID=34814, Weight=20, Name=Early 2010's
 4. Type=ERA, ID=2648, Weight=20, Name=Late 90's
 5. Type=GENRE, ID=2792, Weight=22, Name=Neo-Lounge
 6. Type=GENRE, ID=18981, Weight=14, Name= Chanson Jazz
 7. Type=GENRE, ID=3164, Weight=14, Name= Cabaret
 8. Type=GENRE, ID=18811, Weight=14, Name=Indie Cabaret
 Pop-Rock
 9. Type-GENRE, ID=3337, Weight=14, Name=Bossa Nova
 10. Type=GENRE, ID=3175, Weight=14, Name=Cocktail Music
 11. Type-GENRE, ID=18833, Weight=8, Name=Soft Jazz Vocals
 12. Type=MOOD, ID=34163, Weight=27, Name=Sophisticated /
 Lush / Romantic
 13. Type=MOOD, ID=34409, Weight=20, Name=Lively / Playful
 / Swingin'
 14. Type=MOOD, ID=34207, Weight=7, Name=Sultry / Swank
 15. Type=MOOD, ID=34415, Weight=6, Name=Charming / Easy-
 Going
 16. Type=MOOD, ID=34190, Weight=5, Name=Blue / Depressed
 / Lonely
 17. Type=MOOD, ID=34408, Weight=5, Name=Showy / Dramatic
 / Rousing / Lively
 18. Type-MOOD, ID=34192, Weight=3, Name-Gritty / Earthy /
 Soulful
 19. Type-MOOD, ID=34168, Weight=2, Name=Sweet Ballad
 20. Type-MOOD, ID=34172, Weight=2, Name=Smoky Romantic
 21. Type=MOOD, ID=34189, Weight=2, Name=Tender Sad /
 Soulful
 22. Type=ORIGIN, ID=4525, Weight=100, Name=Portland, OR
Name=Track "High Noon" by Kruder & Dorfmeister
GOETs (13):
 1. Type=ATYPE, ID=2657, Weight=100, Name=Male Duo - Duo
 Vocal
 2. Type=ERA, ID=2645, Weight=75, Name=1990's
 3. Type=ERA, ID=2650, Weight=25, Name=2000's
 4. Type=GENRE, ID=2914, Weight=49, Name=Trip Hop
 5. Type-GENRE, ID=2912, Weight=17, Name=Chill Out
 6. Type=GENRE, ID=2887, Weight=17, Name=Electronica
 Lounge Fusion
 7. Type=GENRE, ID=2865, Weight=17, Name=Electronica
 8. Type=MOOD, ID=34182, Weight=94, Name=Deep Dreamy
 Relaxing Beat
 9. Type=MOOD, ID=34191, Weight=1, Name=Determined /
 Bitter / Serious / Jaded
 10. Type=ORIGIN, ID=4267, Weight=100, Name=Germany
 STEP 1: 2792 (550) 2914 >= 350 -> Compare MOOD
 STEP 1: 34163 (-200) 34182 < -160 -> FAIL
 STEP 2: (Genre=40 Mood=50 Era=5 Origin=3 Artist Type=2)
 Computing GENRE similarity:
  0. 2792/22 (700) 2912/17
  Sum=11900, Weightsum=17
  1. 2792/5 (600) 2887/17
  Sum= 14900, Weightsum=22
```

```
2. 18981/14 (0) 2914/49
Sum= 14900, Weightsum=36
3. 3164/14 (0) 2914/35
Sum= 14900, Weightsum=50
4. 18811/14 (0) 2914/21
Sum= 14900, Weightsum=64
5. 3337/14 (0) 2914/7
Sum= 14900, Weightsum=71
6. 3337/7 (0) 2887/12
Sum= 14900, Weightsum=78
7. 3175/14 (0) 2887/5
Sum=14900, Weightsum=83
8. 3175/9 (0) 2865/17
Sum= 14900, Weightsum=92
9. 18833/8 (0) 2865/8
Sum= 14900, Weightsum=100
--------------------
Known = 149 / 100
====================
Result =149
Computing MOOD similarity:
0. 34190/5 (650) 34191/1
Sum=650, Weightsum=1
1. 34207/7 (200) 34182/94
Sum=2050, Weightsum=8
2. 34189/2 (100) 34182/87
Sum=2250, Weightsum=10
3. 34192/3 (-100) 34182/85
Sum=1950, Weightsum=13
4. 34163/27 (-200) 34182/82
Sum=-3450, Weightsum=40
5. 34172/2 (-200) 34182/55
Sum=-3850, Weightsum=42
6. 34409/20 (-300) 34182/53
Sum=-9850, Weightsum=62
7. 34190/4 (-300) 34182/33
Sum=-11050, Weightsum=66
8. 34168/2 (-400) 34182/29
Sum=-11850, Weightsum=68
9. 34415/6 (-500) 34182/27
Sum=-14850, Weightsum=74
10. 34408/5 (-600) 34182/21
Sum=-17850, Weightsum=79
--------------------
Known = -225 / 79
Unknown = -112 / 21
====================
Result = -201
Computing ERA similarity:
0. 2650/60 (935) 2650/25
Sum=23375, Weightsum=25
1. 2648/20 (873) 2645/75
Sum=40835, Weightsum=45
2. 2650/35 (680) 2645/55
Sum=64635, Weightsum=80
3. 34814/20 (680) 2645/20
Sum=78235, Weightsum=100
--------------------
Known = 782 / 100
====================
Result = 782
Computing ORIGIN similarity:
SINGLE: 4525 (281) 4267
Computing ARTIST TYPE similarity
SINGLE: 2662 (585) 2657
RESULT:
Step1 = FAIL
Step2:
  * Genre = 149
  * Origin = 281
  * Era = 782
  * Artist Type = 585
  * Mood = -201
  * Weighted = 18
====================
  SIMILARITY = 0
```

Step one failed because, while the primary genres correlate by 550 (which is above the example specified threshold of 350), the primary moods correlate only by −200, which is below the example specified threshold of −160. As before, going through step two is not necessary if step one fails; it is shown here for the sake of completeness. Regardless of the weighted score, the overall similarity score will be 0, since step one failed.

In addition to the capability to generate a station library based on direct attribute filters (e.g., utilizing station library criteria to track similarity comparisons), a particular artist or track may be used as an indirect way to define a complex descriptive vector as a component of a station definition or as all of the station definitions, in another example embodiment.

In another example embodiment, the system may allow a user to select and filter out specific tracks, albums, and artists as part of a station definition. For example, the user may select specific tracks or identify particular albums and artists from a station library result set displayed in a user interface. The results generated going forward would exclude the selected content.

In another example embodiment, the system may provide the ability to filter, boost, and/or penalize candidate tracks based on other flags or attributes of the candidate tracks to further focus the nature of the station library content. Some examples of filters may include: duration, live, explicit, occasion appropriateness (e.g., Christmas), lyric topic, demo, alternative take, re-recording, explicit, clean, record label, language, energy, and acoustic/electric. The system may further provide the ability to use lists of previously flagged or scored "key artists," "key albums," and/or "key tracks" in order to boost the likelihood of certain tracks appearing in a station library based on editorial preference. In addition, the system may provide the ability to use artists or tracks as "seeds" as a component (along with criteria based filters) of a station definition, or as all of a station definition. Furthermore, the system may provide the ability to utilize "related artist" associative relationship data to boost the likelihood of certain tracks appearing in the station library.

Embodiments described herein generally refer to media curation of audio content. It is understood that embodiments described herein may be used for other media content (e.g., video, mixed media, etc.) and other media curation. In one example, embodiments described herein may be used for curation of music videos or other videos.

Figure 12:
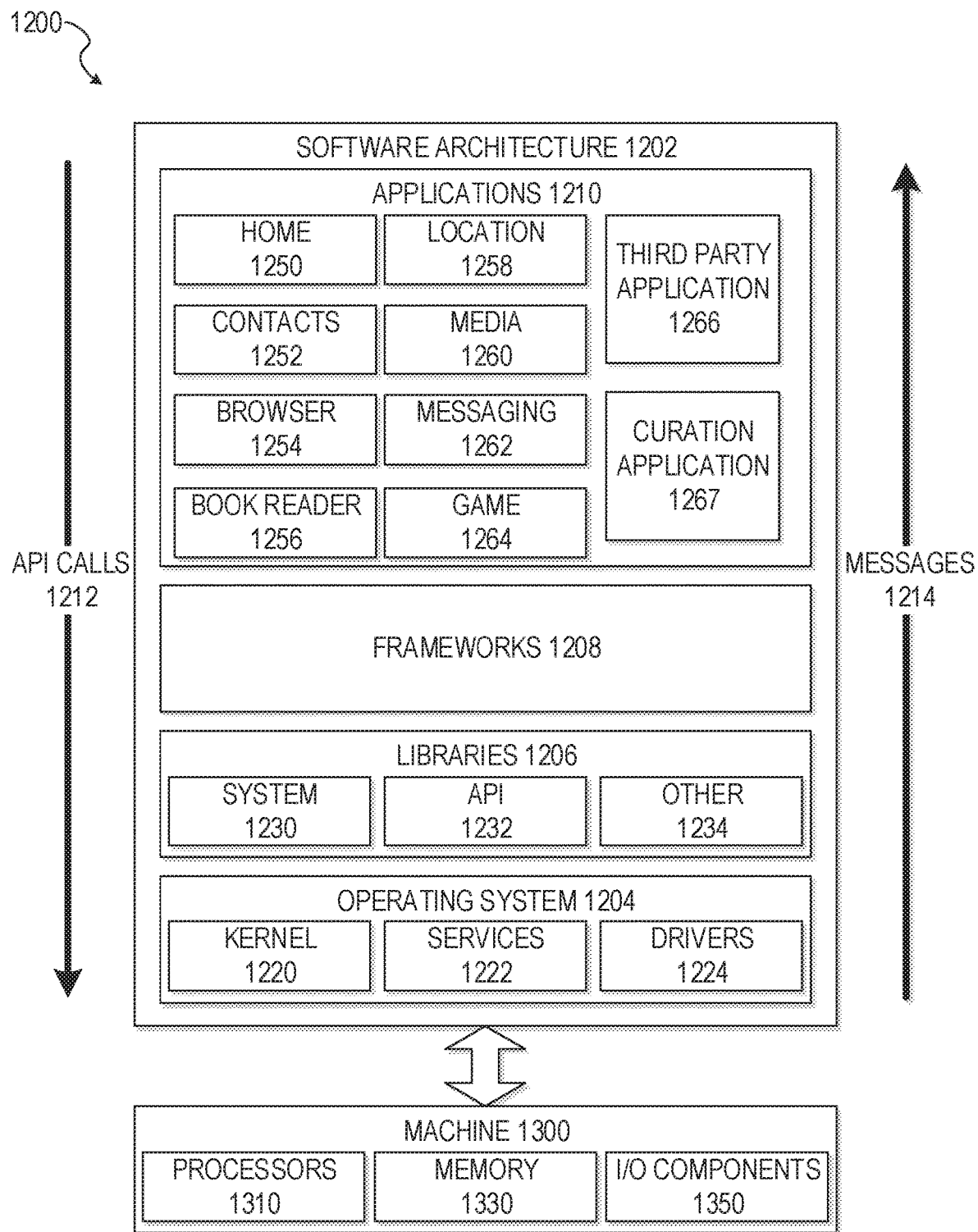
FIG. 12 is a block diagram illustrating an example of a software architecture that may be installed on a machine, according to some example embodiments.

FIG. 12 is a block diagram 1200 illustrating a software architecture 1202, which can be installed on any one or more of the devices used to implement any of the embodiments described herein. For example, in various embodiments, client devices 110 and server machines or systems 130, 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266 and curation application 1267. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1266 can invoke the API calls 1212 provided by the operating system 1204 to facilitate functionality described herein.

Figure 13:
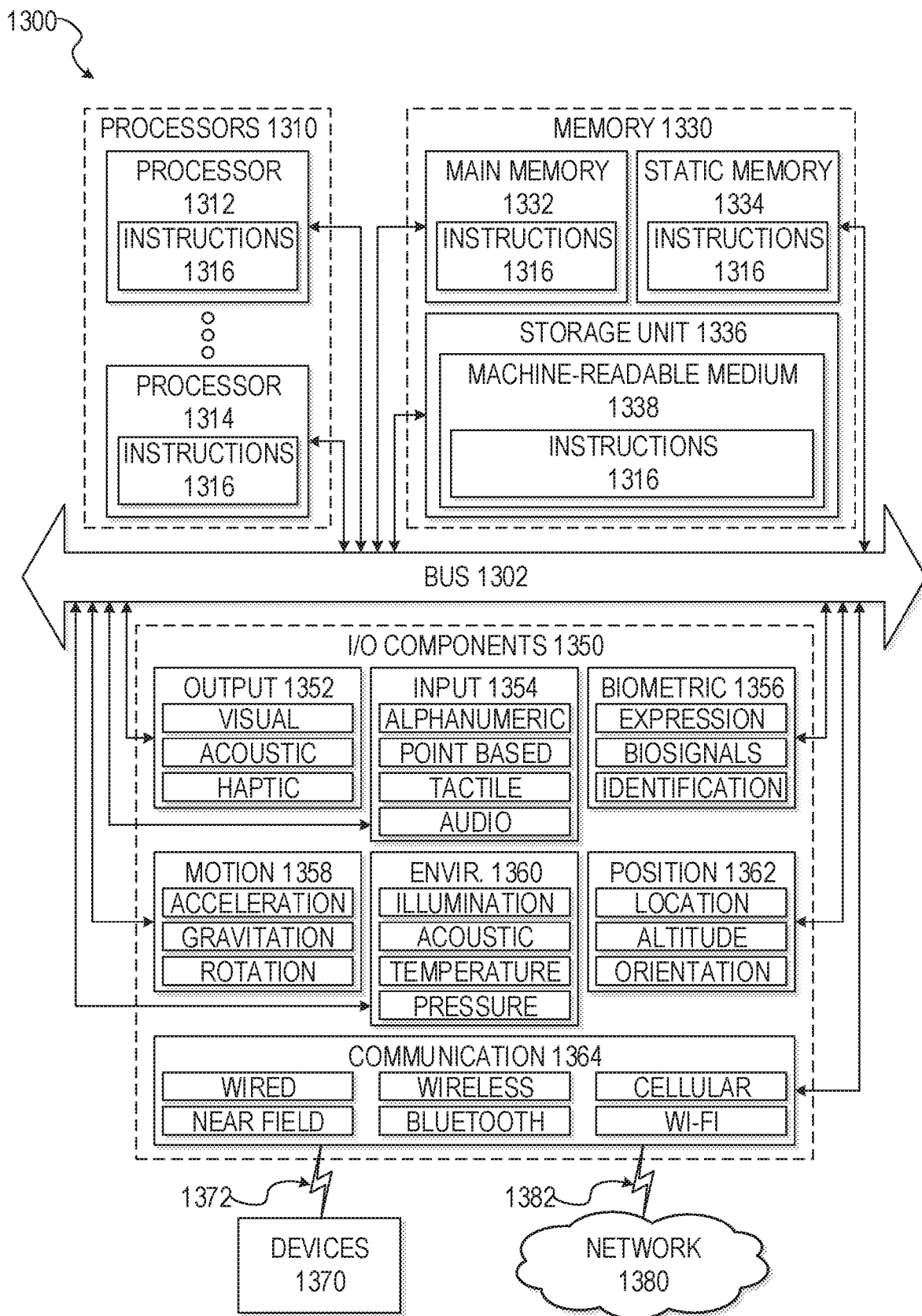
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or system 130, 102, 120, 122, 124, etc., or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1310, 1312 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   determining, by a computer, a first total number of tracks to be selected for a station library according to criteria, the criteria including a first criterion;
   generating, by the computer, first similarity scores for respective ones of the tracks of a first list of candidate tracks in a first step, the first step including generating the first similarity scores determining correlation values between a primary criterion for respective ones of the tracks in the first list of candidate tracks and the first criterion, wherein the correlation values are compared to a specified threshold;
   determining, by the computer, first popularity scores for respective ones of the tracks of the first list of candidate tracks;
   combining, by the computer, a first similarity score and a first popularity score associated with each track of the first list of candidate tracks to generate first total scores for respective ones of the tracks of the first list of candidate tracks;
   generating, by the computer, a first list of top ranked tracks for the first criterion based on the first total scores and the first total number of tracks; and
   adding, by the computer, the first list of top ranked tracks of the first criterion as part of the station library.

2. The method of claim 1, wherein the criteria include a second criterion and wherein the method further comprises:
   filtering at least one media content catalog based on the criteria for the station library to generate a second list of candidate tracks for the station library;
   determining a second total number of tracks to be selected for the second criterion based on the criteria;
   generating second similarity scores for respective tracks of the second list of candidate tracks;
   determining second popularity scores for respective tracks of the second list of candidate tracks;
   combining a second similarity score and a second popularity score associated with each track of the second list of candidate tracks to generate second total scores for respective ones of the tracks of the second list of candidate tracks;
   ranking the second list of candidate tracks based on the second total scores for respective tracks of the second list of candidate tracks;
   generating a second list of top ranked tracks for the second criterion based on the second total number of tracks; and
   adding the second list of top ranked tracks of the second criterion as part of the station library.

3. The method of claim 2, further comprising:
   combining the first list of top ranked tracks for the first criterion and the second list of top ranked tracks for the second criterion into the station library.

4. The method of claim 3, further comprising:
   sorting the station library based on at least one of the first total scores or the second total scores associated with each track in the station library.

5. The method of claim 1, wherein the station library includes a list of audio tracks and at least one descriptor including at least one of a rank, a title, an artist, an artist type, an album, a genre, a mood, an era, an origin, a popularity score, a similarity score, a total score, a catalogue identifier, or an external identifier.

6. The method of claim 1, wherein the criteria for the station library include at least one of a genre, a mood, an era, an origin, an artist type, an artist profile, a catalogue identifier, or a percent mix.

7. The method of claim 1, wherein generating the similarity scores for respective ones of the tracks in the first list of candidate tracks includes comparing the criteria and qualities associated with each track.

8. The method of claim 1, wherein a second step in generating the first similarity scores for respective ones of the tracks in the first list of candidate tracks includes weighting the first similarity scores based on at least a vector, the similarity scores derived using an iterative process, the iterative process to add a common weight of the correlation values to an allocated weight sum until all weights in the vector are allocated.

9. The method of claim 1, wherein the criteria include a percent mix for the first criterion, and wherein determining the first total number of tracks to be selected for the first criterion is based on at least one of a percent mix or a predetermined total number of tracks for a station library.

10. The method of claim 1, further including ranking the tracks of the first list of candidate tracks based on a total score of the first total scores or the second total scores associated with each track.

11. The method of claim 1, wherein the computer is a server computer.

12. The method of claim 1, wherein the computer is a client computer.

13. A system, comprising:
a processor; and
a non-transitory machine-readable medium including instructions that, when executed, cause the processor to perform a set of operations comprising:
determining a first total number of tracks to be selected for a station library according to criteria, the criteria including a first criterion;
generating first similarity scores for respective ones of the tracks of a first list of candidate tracks in a first step, the first step including generating the first similarity scores determining correlation values between a primary criterion for respective ones of the tracks in the first list of candidate tracks and the first criterion, wherein the correlation values are compared to a specified threshold;
determining first popularity scores for respective ones of the tracks of the first list of candidate tracks;
combining a first similarity score and a first popularity score associated with each track of the first list of candidate tracks to generate first total scores for respective ones of the tracks of the first list of candidate tracks;
generating a first list of top ranked tracks for the first criterion based on the first total scores and the first total number of tracks; and
adding the first list of top ranked tracks of the first criterion as part of the station library.

14. The system of claim 13, wherein the criteria include a second criterion and wherein the set of operations further comprises:
filtering at least one media content catalog based on the criteria for the station library to generate a second list of candidate tracks for the station library;
determining a second total number of tracks to be selected for the second criterion based on the criteria;
generating second similarity scores for respective tracks of the second list of candidate tracks;
determining second popularity scores for respective tracks of the second list of candidate tracks;
combining a second similarity score and a second popularity score associated with each track of the second list of candidate tracks to generate second total scores for respective ones of the tracks of the second list of candidate tracks;
ranking the second list of candidate tracks based on the second total scores for respective tracks of the second list of candidate tracks;
generating a second list of top ranked tracks for the second criterion based on the second total number of tracks; and
adding the second list of top ranked tracks of the second criterion as part of the station library.

15. The system of claim 14, the set of operations further comprising:
combining the first list of top ranked tracks for the first criterion and the second list of top ranked tracks for the second criterion into the station library.

16. The system of claim 15, the set of operations further comprising:
sorting the station library based on at least one of the first total scores or the second total scores associated with each track in the station library.

17. The system of claim 13, wherein generating the similarity scores for respective ones of the tracks in the first list of candidate tracks includes comparing the criteria and qualities associated with each track.

18. The system of claim 13, wherein a second step in generating the first similarity scores for respective ones of the tracks in the first list of candidate tracks includes weighting the first similarity scores based on at least a vector, the similarity scores derived using an iterative process, the iterative process to add a common weight of the correlation values to an allocated weight sum until all weights in the vector are allocated.

19. The system of claim 13, wherein the criteria include a percent mix for the first criterion, and wherein determining the first total number of tracks to be selected for the first criterion is based on at least one of a percent mix or a predetermined total number of tracks for a station library.

20. A non-transitory machine-readable medium having stored thereon instructions that upon execution by a computer, cause performance of a set of operations comprising:
determining a first total number of tracks to be selected for a station library according to criteria, the criteria including a first criterion;
generating first similarity scores for respective ones of the tracks of a first list of candidate tracks in a first step, the first step including generating the first similarity scores determining correlation values between a primary criterion for respective ones of the tracks in the first list of candidate tracks and the first criterion, wherein the correlation values are compared to a specified threshold;
determining first popularity scores for respective ones of the tracks of the first list of candidate tracks;
combining a first similarity score and a first popularity score associated with each track of the first list of candidate tracks to generate first total scores for respective ones of the tracks of the first list of candidate tracks;
generating a first list of top ranked tracks for the first criterion based on the first total scores and the first total number of tracks; and
adding the first list of top ranked tracks of the first criterion as part of the station library.

* * * * *